US010373226B1

(12) United States Patent
Russell et al.

(10) Patent No.: US 10,373,226 B1
(45) Date of Patent: Aug. 6, 2019

(54) INTERACTIVE PARKING FACILITIES

(71) Applicant: Amazon Technologies, Inc., Seattle, WA (US)

(72) Inventors: Ryan Scott Russell, Bellevue, WA (US); Phillip Michael Stevens, Snoqualmie, WA (US); Prashant Hegde, Seattle, WA (US); Wesley Scott Lauka, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 832 days.

(21) Appl. No.: 14/741,369

(22) Filed: Jun. 16, 2015

(51) Int. Cl.
G06Q 30/00 (2012.01)
G06Q 30/06 (2012.01)
G06K 9/00 (2006.01)
G01S 13/75 (2006.01)

(52) U.S. Cl.
CPC ........ *G06Q 30/0613* (2013.01); *G01S 13/758* (2013.01); *G06K 9/00771* (2013.01); *G06K 9/00812* (2013.01); *G06Q 30/0635* (2013.01); *G06K 2209/15* (2013.01)

(58) Field of Classification Search
CPC ................ G06Q 30/0601; G06Q 30/0641
USPC .............................................. 705/26.1, 27.1
See application file for complete search history.

(56) References Cited

U.S. PATENT DOCUMENTS

| | | | |
|---|---|---|---|
| 6,366,242 B1 | 4/2002 | Boyd et al. | |
| 6,531,964 B1 | 3/2003 | Loving | |
| 8,169,303 B2 | 5/2012 | Hanebeck | |
| 8,401,230 B2 | 3/2013 | Kozitsky et al. | |
| 8,482,412 B2 | 7/2013 | Majoros et al. | |
| 8,542,834 B1 | 9/2013 | Feikis et al. | |
| 8,556,178 B2 | 10/2013 | Wang et al. | |
| 8,893,969 B2 | 11/2014 | Brandl | |
| 9,405,948 B2 | 8/2016 | Schwiers et al. | |
| 9,633,389 B2 | 4/2017 | Carr et al. | |

(Continued)

FOREIGN PATENT DOCUMENTS

| | | |
|---|---|---|
| AU | 2015282374 A1 | 5/2016 |
| KR | 101521457 B1 | 5/2015 |
| WO | 2014093968 A1 | 6/2014 |

OTHER PUBLICATIONS

Takeout meals on the rise, Jun. 19, 2006, The Food Institute (Year: 2006).*

(Continued)

*Primary Examiner* — Brittney N Miller
(74) *Attorney, Agent, or Firm* — Athorus, PLLC

(57) ABSTRACT

Interactive parking facilities may include one or more computer displays or other output devices for providing information to occupants of vehicles arriving at the parking facilities, and for providing information to workers tasked with delivering items to such occupants. A vehicle and/or an occupant may be identified at a parking space, and an ordered item associated with the vehicle or the occupant may then be placed in a staging area. Instructions to deliver the item from the staging area to the vehicle may be displayed to a worker, and information regarding the pending arrival of the item may be displayed to the occupant, on one or more computer displays. Thus, the fulfillment of an order may be triggered upon detecting the arrival of the vehicle at a parking space, and the delivery of the one or more items to the vehicle may be guided based on such information.

17 Claims, 20 Drawing Sheets

(56) References Cited

U.S. PATENT DOCUMENTS

| | | |
|---|---|---|
| 2002/0067264 A1 | 6/2002 | Soehnlen |
| 2002/0111881 A1 | 8/2002 | Walker et al. |
| 2002/0185542 A1 | 12/2002 | Wilz et al. |
| 2003/0075608 A1 | 4/2003 | Atherton |
| 2003/0189493 A1 | 10/2003 | Klausner et al. |
| 2004/0066296 A1 | 4/2004 | Atherton |
| 2004/0119605 A1 | 6/2004 | Schaper |
| 2005/0183990 A1 | 8/2005 | Corbett |
| 2005/0200476 A1 | 9/2005 | Forr et al. |
| 2005/0203798 A1 | 9/2005 | Jensen et al. |
| 2005/0234774 A1 | 10/2005 | Dupree |
| 2005/0243784 A1 | 11/2005 | Fitzgerald et al. |
| 2005/0284941 A1 | 12/2005 | Lubow |
| 2006/0119481 A1 | 6/2006 | Tethrake et al. |
| 2006/0145880 A1 | 7/2006 | Chi et al. |
| 2006/0186201 A1 | 8/2006 | Hart |
| 2006/0284839 A1 | 12/2006 | Breed et al. |
| 2007/0018832 A1 | 1/2007 | Beigel et al. |
| 2007/0021197 A1 | 1/2007 | Frerking |
| 2007/0030151 A1 | 2/2007 | Morrow |
| 2007/0057469 A1 | 3/2007 | Grauzer et al. |
| 2007/0075148 A1 | 4/2007 | Usami |
| 2007/0075861 A1 | 4/2007 | Cook et al. |
| 2007/0096906 A1 | 5/2007 | Lyons et al. |
| 2007/0109101 A1 | 5/2007 | Colby |
| 2007/0126578 A1 | 6/2007 | Broussard |
| 2007/0136218 A1 | 6/2007 | Bauer et al. |
| 2007/0152829 A1 | 7/2007 | Lindsay et al. |
| 2007/0164863 A1 | 7/2007 | Himberger et al. |
| 2007/0175972 A1 | 8/2007 | Ringer |
| 2007/0296599 A1 | 12/2007 | Wang et al. |
| 2008/0113767 A1 | 5/2008 | Nguyen et al. |
| 2009/0033463 A1 | 2/2009 | Posamentier |
| 2009/0085721 A1 | 4/2009 | Dishongh |
| 2009/0167699 A1 | 7/2009 | Rosenblatt et al. |
| 2009/0309086 A1 | 12/2009 | Behan et al. |
| 2010/0063652 A1 | 3/2010 | Anderson |
| 2010/0097195 A1 | 4/2010 | Majoros et al. |
| 2010/0114426 A1 | 5/2010 | Boss et al. |
| 2010/0123581 A1 | 5/2010 | Hatfield et al. |
| 2010/0171592 A1 | 7/2010 | Kamemaru |
| 2010/0177993 A1 | 7/2010 | Chen |
| 2010/0271187 A1 | 10/2010 | Uysal et al. |
| 2010/0308964 A1 | 12/2010 | Ackley et al. |
| 2010/0308975 A1 | 12/2010 | Gregersen et al. |
| 2011/0163850 A1 | 7/2011 | Bachman et al. |
| 2011/0227748 A1 | 9/2011 | Schaible et al. |
| 2011/0266342 A1 | 11/2011 | Forster |
| 2011/0285507 A1 | 11/2011 | Nelson |
| 2012/0269395 A1* | 10/2012 | Coulter .............. G06K 9/00369 382/103 |
| 2013/0027561 A1* | 1/2013 | Lee ........................ G06Q 30/02 348/150 |
| 2013/0314207 A1 | 11/2013 | Yonekura et al. |
| 2014/0061303 A1 | 3/2014 | Brandl |
| 2014/0061382 A1 | 3/2014 | Tucker |
| 2014/0074743 A1 | 3/2014 | Rademaker |
| 2014/0176307 A1 | 6/2014 | Forster |
| 2014/0232519 A1 | 8/2014 | Allen et al. |
| 2014/0316991 A1 | 10/2014 | Moshal |
| 2015/0357948 A1 | 12/2015 | Goldstein |
| 2016/0148300 A1* | 5/2016 | Carr ................... G06Q 30/0633 705/26.8 |

OTHER PUBLICATIONS

International Search Report and Written Opinion of International Application No. PCT/US2015/037287 dated Sep. 30, 2015.
International Search Report and Written Opinion of International Application No. PCT/US2015/056779 dated Jan. 19, 2016.
International Search Report of International Application No. PCT/US2015/037531 dated Sep. 25, 2015.
Sample, A.P "A Capacitive Touch Interface for Passive RFID tags", 2009 IEEE International Conference on RFID, pp. 103-109.

* cited by examiner

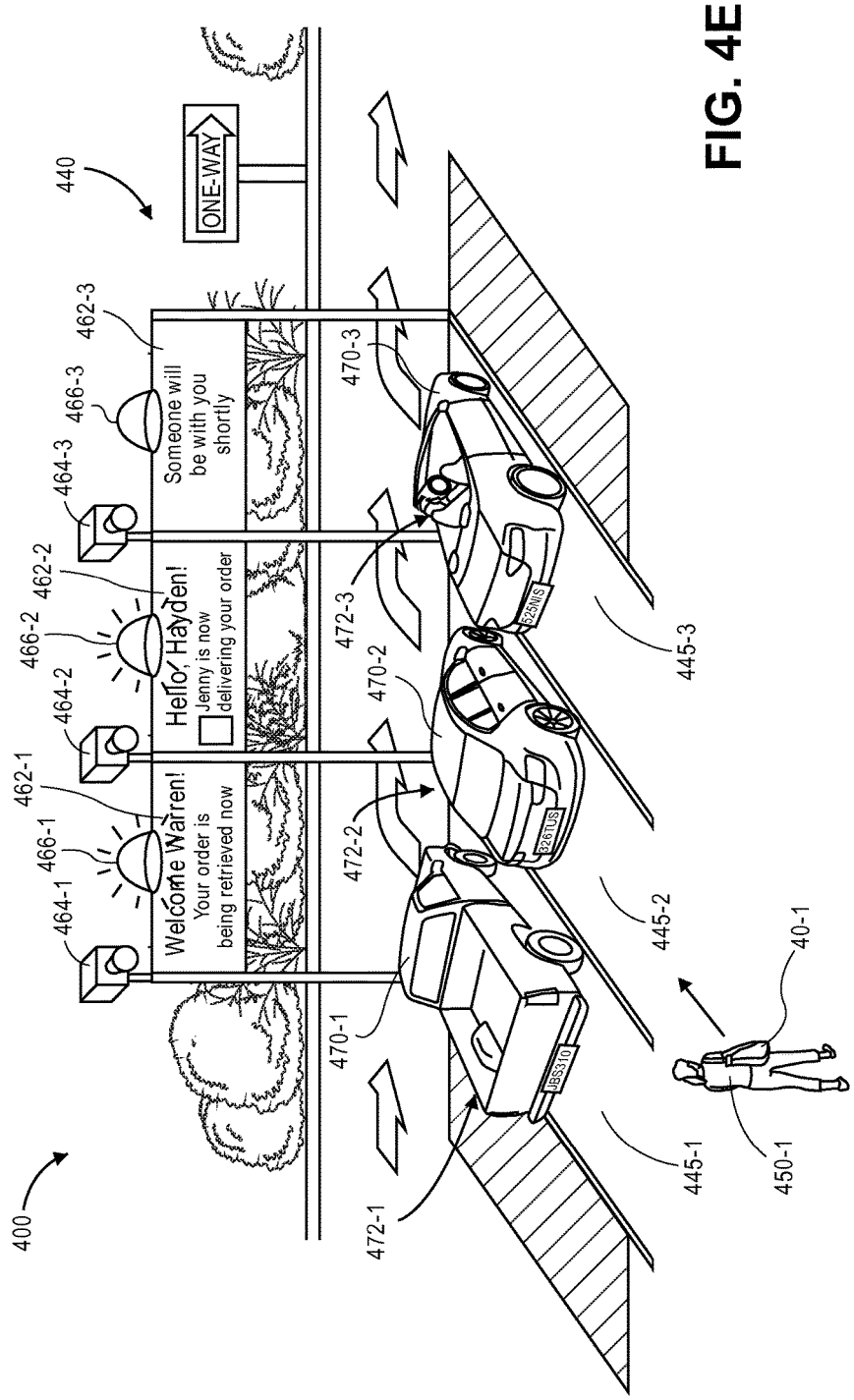

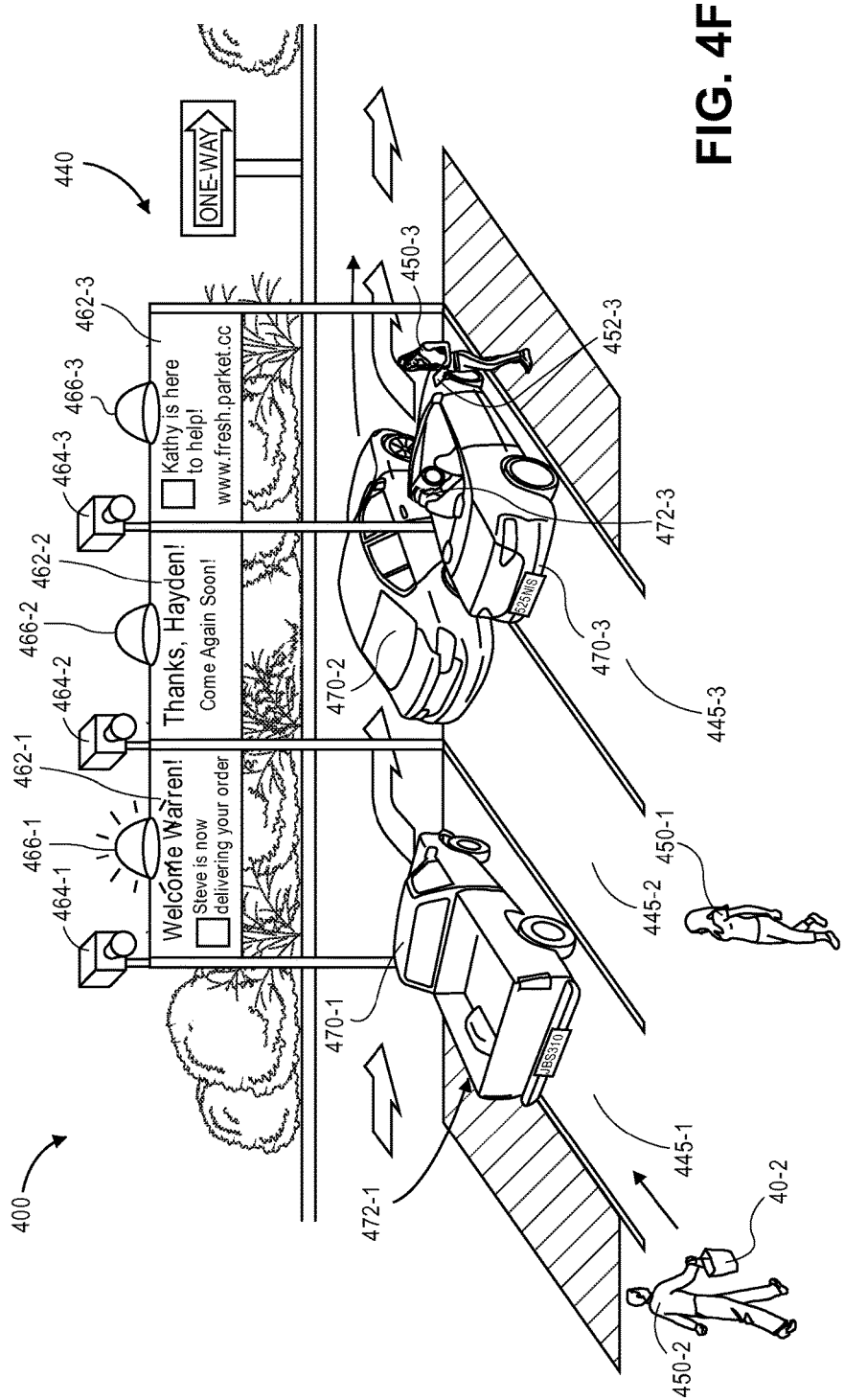

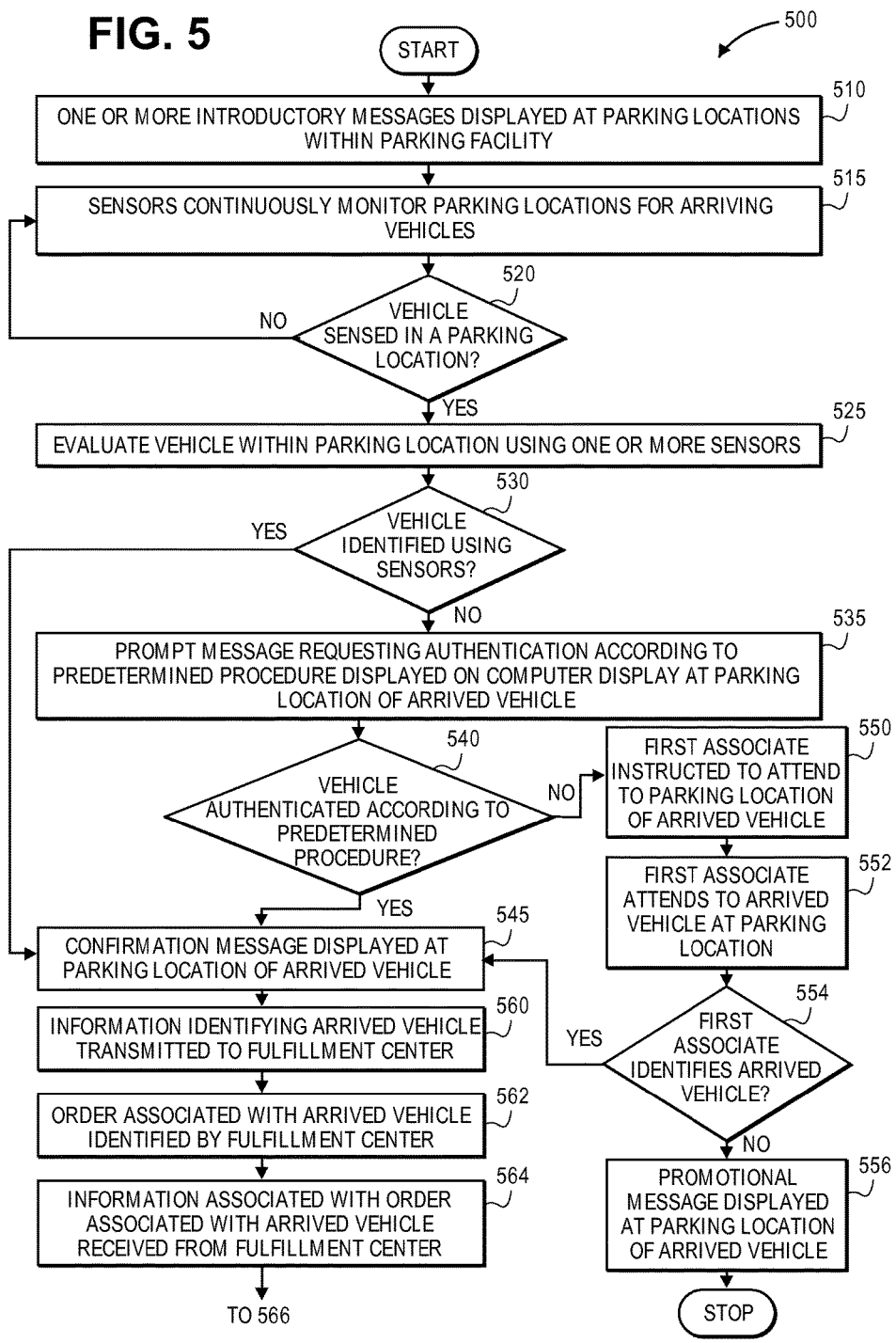

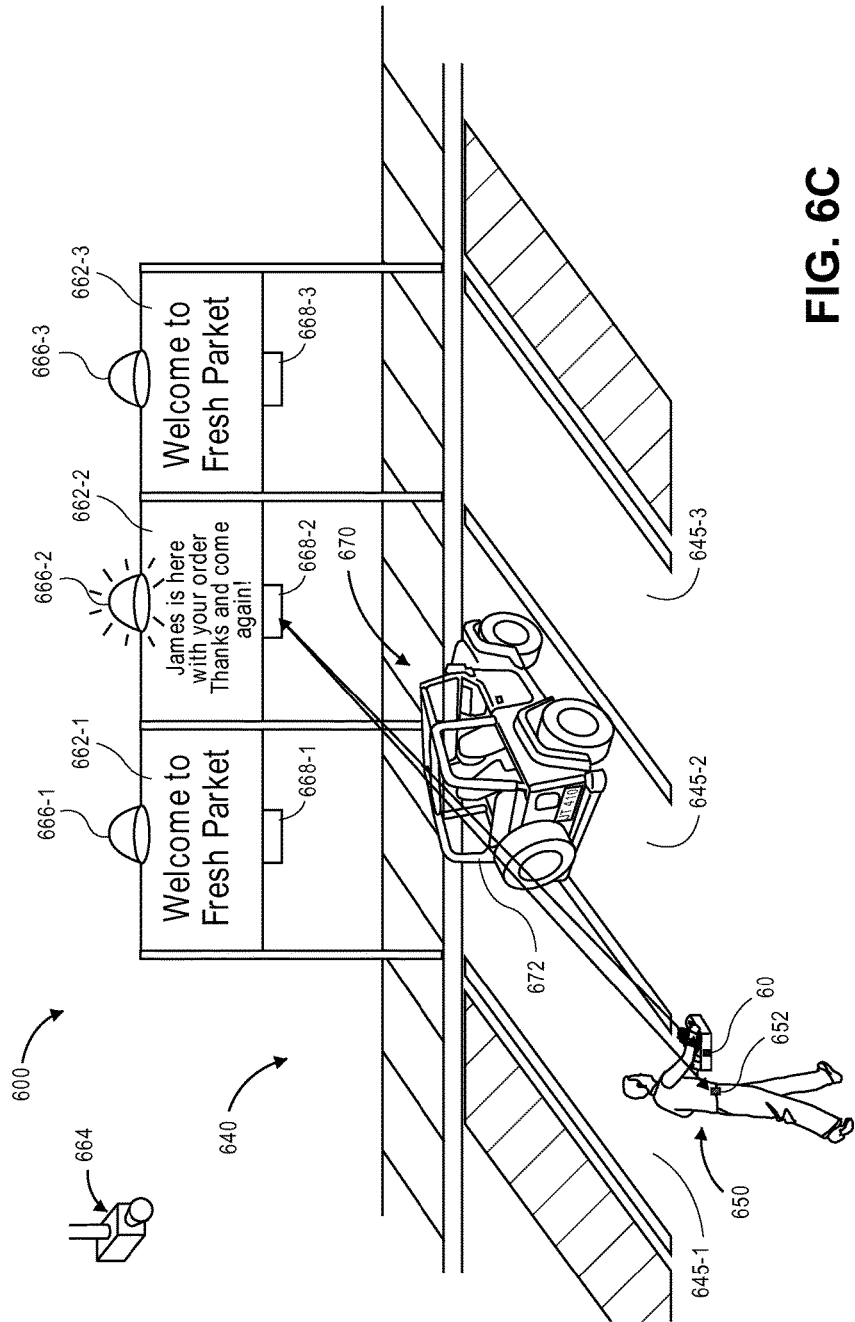

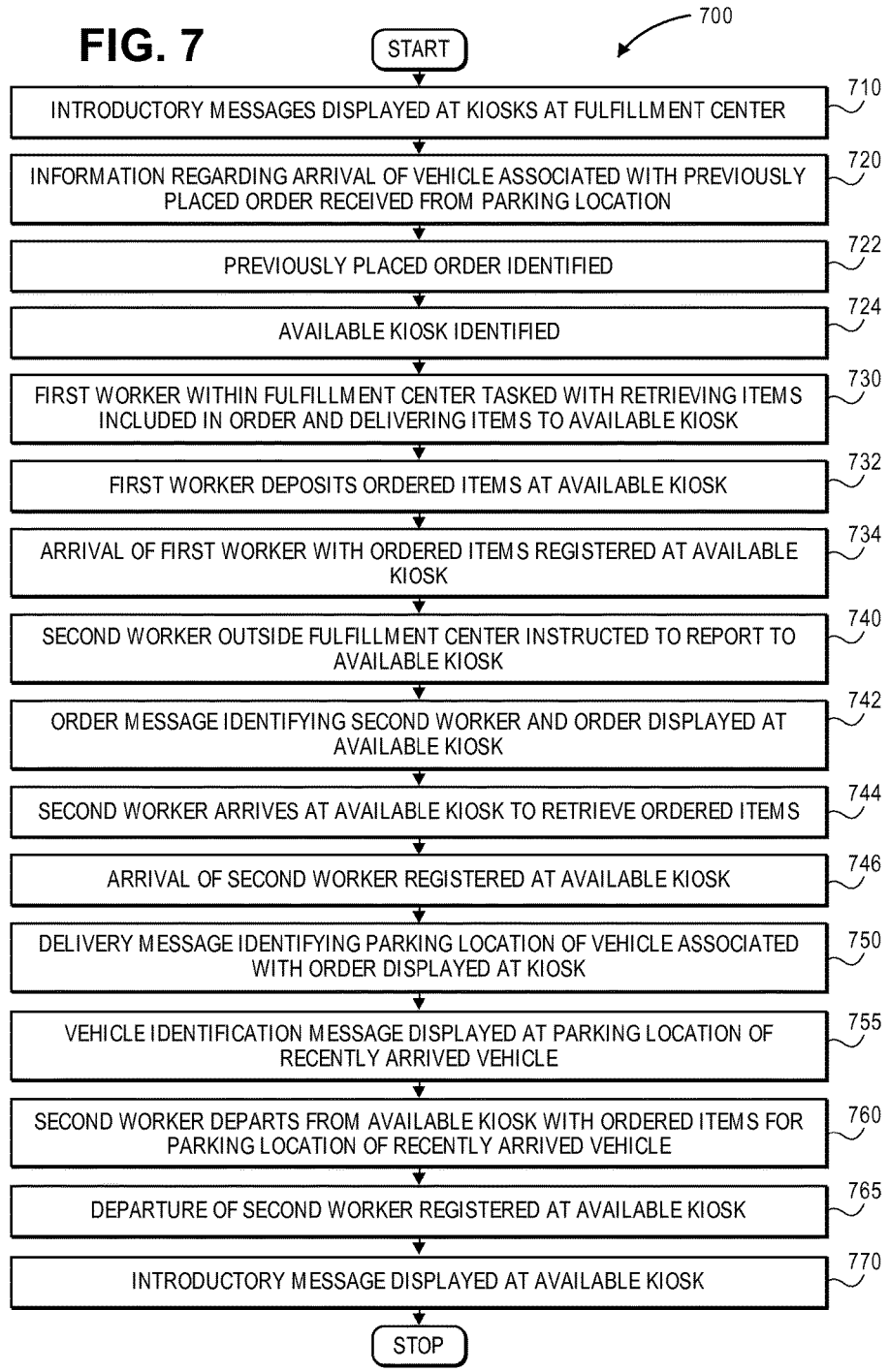

INTERACTIVE PARKING FACILITIES

BACKGROUND

Drive-in retail establishments, such as the restaurants of the chain founded by Sonic Corporation, of Oklahoma City, Okla., in 1953, and drive-through retail establishments, such as banks, restaurants, pharmacies or convenience stores, allow customers to receive service without exiting their automobiles.

Despite several decades of history, drive-in and drive-through retail establishments are currently plagued by a number of challenges and inefficiencies. Through innovation, this offers solutions to some of the existing problems.

BRIEF DESCRIPTION OF THE DRAWINGS

FIGS. 4A through 4G are views of aspects of a system including an interactive parking facility in accordance with embodiments of the present disclosure.

FIGS. 6A through 6C are views of aspects of a system including an interactive parking facility in accordance with embodiments of the present disclosure.

FIG. 7 is a flow chart of one process for fulfilling an order in an interactive parking facility in accordance with embodiments of the present disclosure.

DETAILED DESCRIPTION

As is set forth in greater detail below, the present disclosure is directed to interactive parking facilities, such as parking lots, including one or more interactive communication components. More specifically, the systems and methods disclosed herein are directed to parking facilities associated with fulfillment centers, distribution centers, warehouses, retail establishments or other locations from which customers may retrieve items that they have purchased either in real time, in near-real time, or otherwise in advance of their arrival. The parking facilities may include sensors or other devices for automatically identifying an arriving automobile, or an occupant thereof, and for automatically identifying one or more ordered items associated with the automobile or the occupant. The parking facilities may include kiosks or other staging areas at which a worker or associate may identify and access one or more items purchased by a customer, and parking locations (e.g., parking spaces) at which such customers or others may temporarily park or otherwise deposit their automobiles while awaiting the delivery of their ordered items.

Some implementations of the parking facilities of the present disclosure may further include one or more mounted interactive displays associated with such kiosks or such parking locations, which may visibly present information regarding automobiles, customers or their ordered items to workers at the kiosks, and may visibly present information regarding the workers to automobiles or customers who ordered items at their respective parking locations. A worker may quickly identify an item ordered by a customer, and determine a location of the customer, by visually reading such interactive displays and without having to look down at a map, a receipt, or a handheld device to fulfill an order for the item. An occupant of an automobile that has arrived at such a parking facility may quickly determine the status of an order for one or more items, as well as information regarding a worker, e.g., information that may be stored in a profile of the worker, delivering the ordered items to the automobile, or determine whether any additional actions are required in order to receive his or her ordered items. Such computer displays may be associated with a single worker or a single worker profile, e.g., devices dedicated for use by the single worker or those associated with the single worker profile, or displaying information or executing applications targeted to the single worker or those associated with the single worker profile. Alternatively, the computer displays may be associated with multiple workers or multiple worker profiles, e.g., devices that are open for use by one or more workers associated with any worker profile, or displaying information or executing applications that are intended for any of the one or more workers or those associated with any worker profile.

Figure 1A:
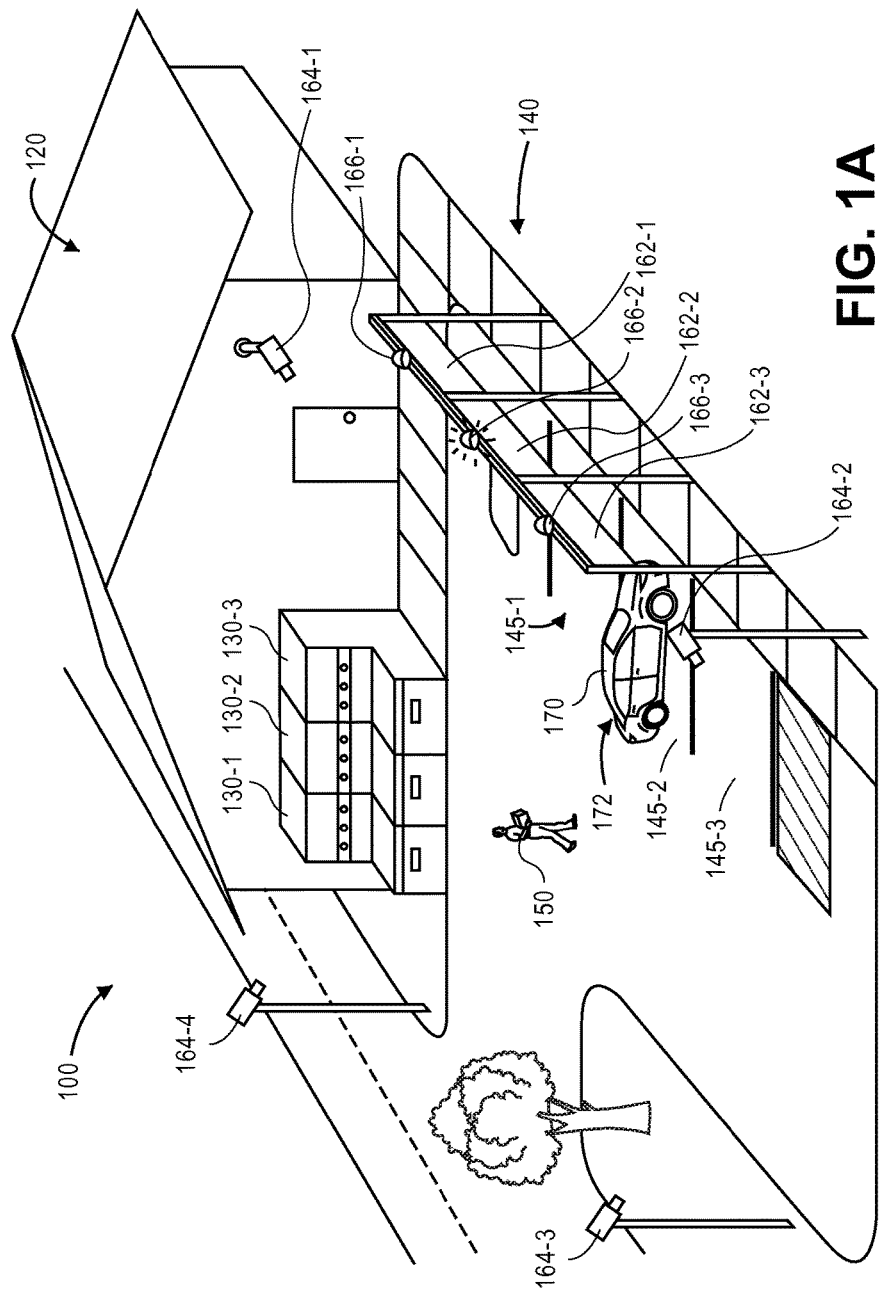
FIGS. 1A through 1C are views of aspects of a system including an interactive parking facility in accordance with embodiments of the present disclosure.

Moreover, some parking facilities of the present disclosure may include one or more sensors of varying types or kinds, which may detect and recognize a customer or a vehicle associated with the customer that has arrived at the parking facility, and inform one or more associates that the customer has arrived at the parking facility and is located in a given parking location. Alternatively, such sensors may determine that a customer or a vehicle that has arrived at the parking facility may not be automatically identified, and that further assistance or attention to the customer or the vehicle may be required. Once an automobile has been automatically identified, information regarding an order associated with the automobile may be determined. If the automobile may not be automatically identified, however, Referring to FIGS. 1A through 1C, a system 100 including an interactive parking lot 140 is shown. The system 100 includes a fulfillment center 120 having a plurality of kiosks 130-1, 130-2, 130-3 and the parking lot 140, which is adjacent to the fulfillment center 120 and further includes a plurality of parking locations (e.g., parking spaces) 145-1, 145-2, 145-3. The fulfillment center 120 may be a distribution center or other like facility configured to receive, store, process and/or distribute items on behalf of an online marketplace, a manufacturer, a merchant, a vendor or a supplier, or a like entity. The kiosks 130-1, 130-2, 130-3 may be connected or associated with the fulfillment center 120 in any manner, and may include one or more access points such as pass-through openings which enable one or more workers (not shown) to deliver items from within the fulfillment center 120 to one or more of the kiosks 130-1, 130-2, 130-3. As is shown in FIG. 1A, the system 100 further includes one or more workers 150 who may deliver items from one of the kiosks 130-1, 130-2, 130-3 to vehicles (e.g., a vehicle 170 operated by a customer 172) in one or more of the parking locations 145-1, 145-2, 145-3. As is also shown in FIG. 1A, a plurality of imaging devices 164-1, 164-2, 164-3, 164-4 are mounted or otherwise provided in association with the parking lot 140, and are configured to capture imaging data (e.g., sets of pixel values corresponding to a field of view, which may represent still or moving images and include associated audio signals or metadata) from areas of the parking lot 140 within their respective fields of view, including but not limited to imaging data regarding the arrival or departure of vehicles, such as the vehicle 170, or the locations or movement of workers, such as the worker 150.

Figure 1B:
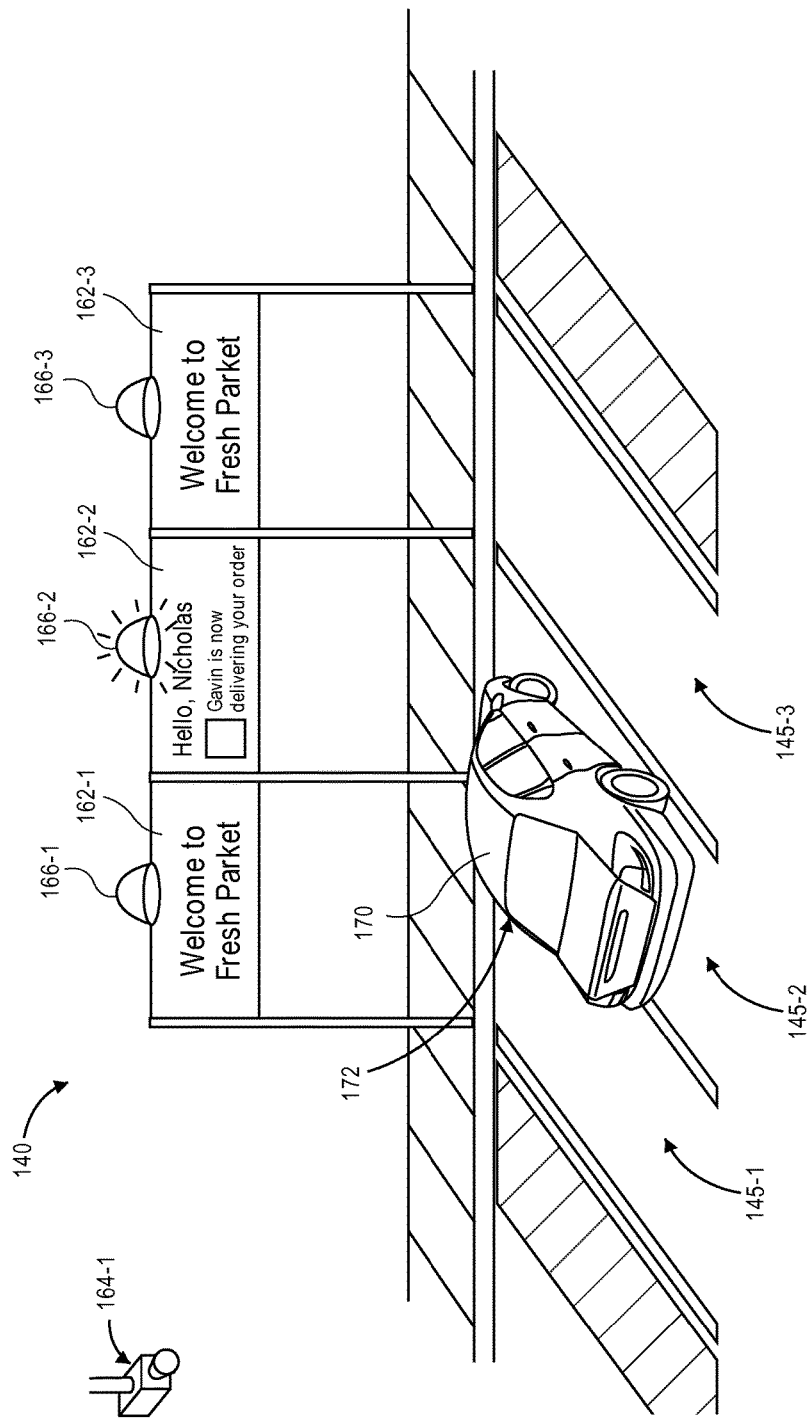

As is shown in FIG. 1B, customers who placed orders for items that are to be fulfilled at the fulfillment center 120, such as the customer 172, may arrive at the parking lot 140 in a vehicle, such as the vehicle 170, and park in one or more of the parking locations 145-1, 145-2, 145-3. Each of the parking locations 145-1, 145-2, 145-3 includes an associated display screen 162-1, 162-2, 162-3 onto which information may be displayed to one or more patrons within automobiles parked at one of the parking locations 145-1, 145-2, 145-3, e.g., the customer 172 within the vehicle 170 in the parking location 145-2. After the arrival of the vehicle 170 is detected, and either the vehicle 170 or the customer 172 is identified, information shown on the display screen 162-2 may describe the status of an order previously placed by the customer 172 that is being fulfilled, and identify one or more workers, e.g., the worker 150, who will be delivering the ordered items from one of the kiosks 130-1, 130-2, 130-3 to the customer 172 at the vehicle 170. Alternatively, or additionally, the display screen 162-2 may include further information regarding the order placed by the customer 172 (not shown), including but not limited to an estimated time of arrival, a summary or description of the items to be included in the order, or any other relevant information or data regarding the customer 172, the worker 150, the fulfillment center 130 or an online marketplace, a manufacturer, a merchant, a vendor or a supplier, or a like entity with which the fulfillment center 130 may be associated.

As is also shown in FIG. 1B, imaging data captured from the parking locations 145-1, 145-2, 145-3 by one or more of the imaging devices 164-1, 164-2, 164-3, 164-4 may be analyzed or otherwise processed in order to determine whether one or more of the parking locations 145-1, 145-2, 145-3 includes a vehicle of any type or form, such as the vehicle 170, and also to identify the vehicles therein based on such imaging data. Alternatively, or in addition to the imaging devices 164-1, 164-2, 164-3, 164-4, the parking locations 145-1, 145-2, 145-3 may include one or more other sensors, such as range cameras, scales, microphones, magnetic field sensors or the like for determining whether a vehicle is present in a parking location or, if a vehicle is present, for identifying the vehicle. Furthermore, each of the parking locations 145-1, 145-2, 145-3 also includes an indicator 166-1, 166-2, 166-3 (e.g., an illuminated light source) that may indicate whether one or the parking locations 145-1, 145-2, 145-3 includes a vehicle for which an associated order has been identified.

The indicators 166-1, 166-2, 166-3 may include one or more lights of a single color, or of multiple colors. The indicators 166-1, 166-2, 166-3 may thereby indicate that one or more of the parking locations 145-1, 145-2, 145-3 includes a recognized vehicle that has been associated with an order to be fulfilled at the fulfillment center 120 when an associated indicator 166-1, 166-2, 166-3 is illuminated or otherwise activated. The indicators 166-1, 166-2, 166-3 may also indicate that the parking locations 145-1, 145-2, 145-3 do not include any recognized vehicles, or that any vehicles therein have not been associated with any orders being fulfilled at the fulfillment center 120, when the associated indicator 166-1, 166-2, 166-3 is not illuminated or otherwise activated.

Figure 1C:
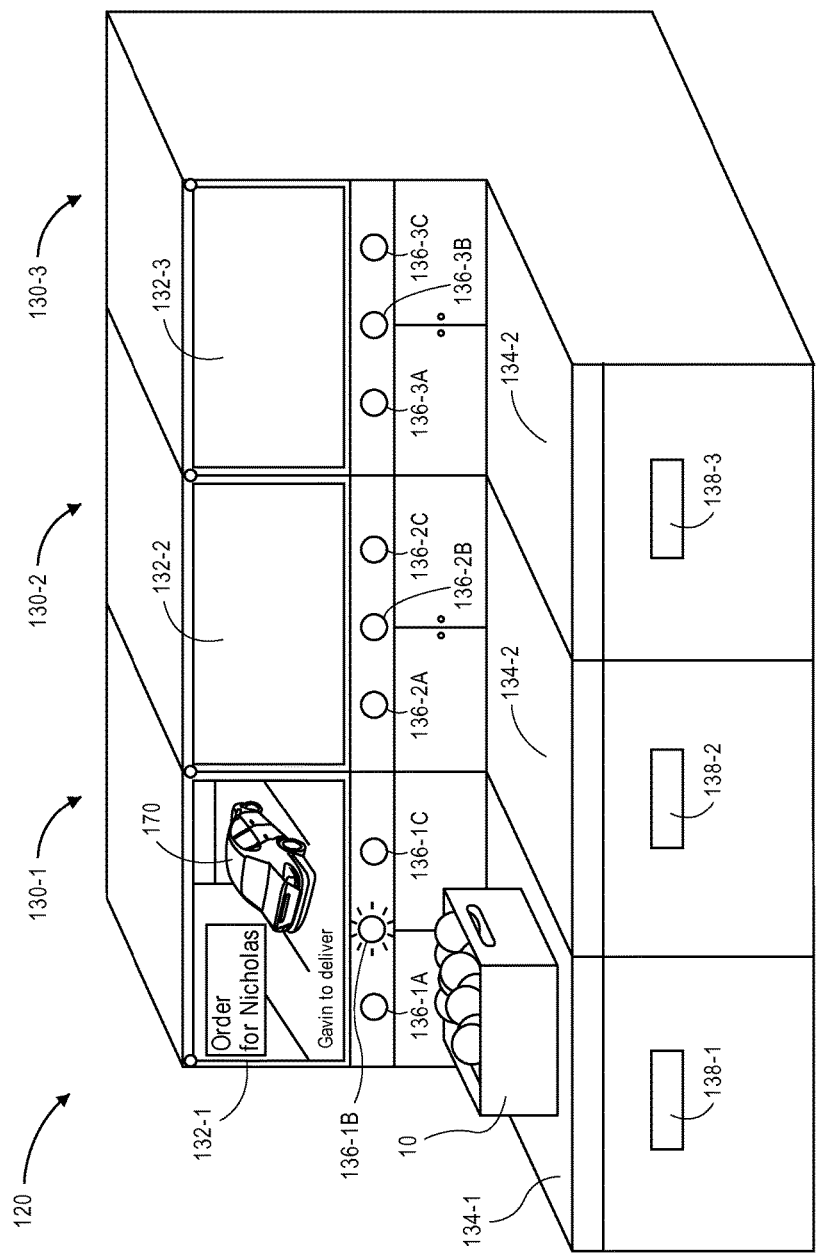

As is shown in FIG. 1C, the kiosks 130-1, 130-2, 130-3 are configured to not only host and temporarily store one or more items to be delivered to a customer but also provide information regarding the customer (e.g., a location of the customer, an identity of the customer, information regarding a vehicle in which the customer is located, such as an image of the vehicle 170 or the customer 172) to a worker in order to enable the worker to easily and timely deliver the ordered items from one of the kiosks 130-1, 130-2, 130-3 to the customer. Each of the kiosks 130-1, 130-2, 130-3 includes a display screen 132-1, 132-2, 132-3, as well as a sensor 134-1, 134-2, 134-3, a plurality of indicator lights 136-1A, 136-1B, 136-1C, 136-2A, 136-2B, 136-2C, 136-3A, 136-3B, 136-3C and a reader 138-1, 138-2, 138-3.

The display screens 132-1, 132-2, 132-3 may be any type or form of display device configured to present information to a worker regarding the condition of one or more items or orders for items (e.g., the contents of an order, a parking location to which the ordered items are to be delivered, and any identifying features of a vehicle or a customer located in the parking location). The sensors 134-1, 134-2, 134-3 may include or comprise any component (e.g., imaging devices, depth cameras, scales or other weight sensors) for acknowledging or confirming the presence of one or more ordered items, e.g., the item 10, deposited at the kiosks 130-1, 130-2, 130-3 by one or more workers. The indicator lights 136-1A, 136-1B, 136-1C, 136-2A, 136-2B, 136-2C, 136-3A, 136-3B, 136-3C may each correspond to one of the parking locations 145-1, 145-2, 145-3 shown in FIG. 1B, and may, when illuminated or otherwise activated, indicate a connection between the associated parking location 145-1, 145-2, 145-3 and the kiosk 130-1, 130-2, 130-3. The readers 138-1, 138-2, 138-3 may be any component for receiving and interpreting any information regarding a worker, an item, a container or any other aspect of the present disclosure, including but not limited to a scanner or an RFID reader.

In accordance with the present disclosure, upon an arrival of a car, a truck, a motorcycle or any other type or form of vehicle, such as the vehicle 170 of FIG. 1A or 1B, at any one of the parking spaces or other parking locations within a parking lot or other parking facility, the vehicle may be recognized using one or more sensors, e.g., one or more of the imaging devices 164-1, 164-2, 164-3, 164-4. Subsequently, information regarding the arrival of the vehicle may be provided to one or more workers or other staff members at a fulfillment center or like facility, who may retrieve items ordered by an owner or occupant of the vehicle, or another person associated with the vehicle, and deliver such items to a kiosk or like station, such as one or more of the kiosks 130-1, 130-2, 130-3. Thereafter, information identifying a worker tasked with delivering the items to the vehicle, as well as information regarding a customer who placed an order for the items or the vehicle associated with the order may be displayed on a computer display at the kiosks, such as on one or more of the display screens 132-1, 132-2, 132-3. After the worker retrieves the items from a kiosk, information identifying the vehicle to which the items are to be delivered, or a customer who ordered the items, maybe displayed on a computer display near or adjacent to the vehicle, such as on one or more of the display screens 162-1, 162-2, 162-3.

Accordingly, an interactive parking facility, such as a parking lot, in accordance with the present disclosure may be configured to enable a customer or another individual to arrive at a destination in a vehicle for the purpose of retrieving ordered items. The vehicle and/or the customer may be automatically recognized in a specific location (e.g., in a specific parking space) at the interactive parking facility by one or more sensors or like devices. Subsequently, items ordered by the customer or another individual associated with the vehicle may be retrieved by one or more workers from a fulfillment center or like facility, and delivered to the vehicle at the specific location. The workers may be automatically recognized at one or more locations within or about the interactive parking facility using one or more sensors or readers, and may be automatically guided to the vehicle using information displayed at one or more locations within or about the interactive parking facility. In this regard, the items ordered by a customer may be quickly and efficiently delivered to a vehicle designated by the customer, without requiring the customer or another occupant of the vehicle to exit the vehicle or enter a facility to retrieve the items, by workers who may locate the customer or occupant in the vehicle without having to rely on a handheld device, a map or another source of information.

As is discussed above, the advent of the automobile industry in the United States provided greater freedom and flexibility for consumers to move outward from urban centers and travel to a wider variety of locations by car. America's love affair with automobiles has come at the expense of her land, however, as the United States now includes more than 500 million parking spaces for its 320 million residents, with such spaces occupying an area that is larger than the states of Delaware and Rhode Island combined. Many zoning requirements imposed by states or municipalities call for a minimum number of parking spaces to be provided outside of or in association with retail establishments, e.g., five spaces per 1,000 square feet of retail space. Therefore, in such jurisdictions, a large retailer in a two hundred thousand square foot facility (e.g., a department store or like establishment) may be required to provide one thousand parking spaces by law. Moreover, some retail establishments are designed to accommodate theoretical maximum parking capacities (e.g., holiday or other peak shopping seasons) year round, and are constructed with more than the number of parking spaces that are legally required. Improving the efficiency of parking facility operations may increase the quality of a customer's experience while further improving the efficiency with which the land associated with a retail establishment is utilized.

Today, most parking facilities are technologically primitive. For example, a parking lot may include lighting implements, drainage facilities, landscaping, signage, and stripes or other markings. A parking garage may further include stairs, elevators, escalators, ramps and other structural components that enable automobiles to be parked on multiple levels. Both parking lots and parking garages may also include automated access control systems and access points (e.g., gates). By and large, however, parking facilities are static structures that are not discernibly different in either form or function from their ancestors of several decades earlier.

In most instances, when a customer wants to acquire a specific item, the customer may identify a retail establishment having the item in stock, drive to a location of the establishment in a car or another vehicle (e.g., a truck or a bicycle), park the car in a parking facility, exit the car and enter the establishment. The customer may then identify and purchase the item before exiting the establishment, entering the car, departing the parking facility and returning to his or her home or another destination with the item. For example, groceries, household supplies and other staples are typically purchased in this manner. In some other instances, when a customer desires a specific item, the customer may identify a retail establishment in possession of or having access to the item, travel to a location of the establishment in a car or another vehicle, and place an order for the item at a window or via an audio/video system from his or her car. When the item becomes available, the item may be provided to the customer via the window if the customer remains in a queue or, alternatively, delivered to the customer by a worker (sometimes called a "car hop") at a nearby parking facility. For example, fast food and pharmaceuticals are commonly purchased in this manner.

In still other instances, when a customer desires a specific item, the customer may identify a retail establishment in possession of or having access to the item, contact the establishment (e.g., by telephone or over the Internet), order the item verbally or electronically, and then travel to a location of the retail establishment in a car or another vehicle. Upon his or her arrival at a parking facility associated with the retail establishment, the customer may exit the car, enter the establishment, pay for the item, depart the establishment with the item, enter the car and return to his or her home or another destination with the item. For example, prepared foods are commonly purchased in this manner.

Each of the foregoing business models includes one or more inherent flaws that tend to delay the process by which a customer may obtain items that he or she desires, however. First, an arrival of a customer at a retail establishment may only be confirmed by the customer himself or herself, e.g., by entering the establishment, or by identifying himself or herself at a window or via an audio/video system. Although some businesses permit customers to call ahead to place an order for one or more items, or to order such items over the Internet, the arrival of the customer, e.g., the actual date or time at which the customer is present to retrieve and pay for his or her items, may only be confirmed when the customer actually identifies himself or herself, and not by any other means. Where timing associated with the items is of the essence, e.g., where the ordered items have a limited shelf life or other period of relevance, fulfilling an order for such items too soon or too late may damage the items or otherwise render them irrelevant, and result in both an unsatisfactory experience for the customer, and damage to one or more brands associated with the items.

Second, where one or more items are to be delivered by a worker to a customer who arrives at a retail establishment in a vehicle and parks the vehicle in a parking facility, the task of locating the vehicle including the customer while transporting the one or more items may be quite challenging. For example, where a number of customers place orders for similar items, or substantially bulky or heavy items, and request to have the items delivered to their cars or trucks while they wait in a parking facility, a worker may have a difficult time in locating the vehicle to which the items are to be delivered. Although some such workers may utilize print or electronic maps or identifiers of a lot, an aisle or a row of a parking location (e.g., a parking space) when attempting attempt to access the parking location or a vehicle, reading information from a piece of paper or a handheld computer device while transporting items by hand or in a tote, bin or cart may prove to be difficult, and result in incorrect or untimely deliveries to a customer while potentially creating a safety concern where the parking facility is active and busy.

The systems and methods of the present disclosure are directed to interactive parking facilities, such as parking lots, which include features for automatically identifying vehicles and/or occupants thereof (e.g., customers or individuals designated by such customers) upon their arrival, for automatically identifying orders for items associated with such vehicles or occupants, and for providing clear and plainly visible instructions to one or more workers to deliver such ordered items to a vehicle and/or an occupant in a given parking location, e.g., a specific parking space, within one of the parking facilities. The interactive parking facilities of the present disclosure may be associated with any type or form of retail establishment, e.g., a fulfillment center, a distribution center or other like facility for receiving and distributing items ordered by customers, and may include one or more interactive kiosks or other staging areas at which items may be staged for their eventual delivery to vehicles. The interactive parking facilities may further include one or more interactive parking locations where vehicles of any type or form may park while awaiting deliveries of ordered items by one or more workers.

Some of the interactive parking facilities of the present disclosure are intended to address one or more of the challenges or inefficiencies associated with prior art systems for fulfilling orders placed by customers prior to their arrival at a parking facility, or prior art systems for delivering ordered items to such customers upon their arrival at the parking facility. For example, in some implementations, the interactive parking facilities may include one or more sensors (e.g., digital cameras or other devices) for recognizing that a vehicle has arrived therein, and for attempting to identify the vehicles or one or more occupants thereof based on one or more attributes of the vehicle, including but not limited to license plates or other markings or indicia provided thereon. If a vehicle or an occupant thereof may be automatically identified upon its arrival using the one or more sensors, then an order associated with the vehicle (e.g., an order placed by an owner, an operator or a passenger in the vehicle, or by another individual not presently in the vehicle) may be automatically identified, and the items included in the order may be retrieved and transferred to a kiosk, where the items may be retrieved by a worker and delivered to the vehicle.

If the vehicle or one or more occupants thereof may not be automatically identified upon its arrival using one or more sensors, however, then one or more of the occupants may attempt to authenticate the vehicle via one or more networked systems (e.g., by logging into via an application, such as a browser, on a handheld device) or by otherwise identifying the vehicle or themselves to one or more of such systems. If the vehicle may not be automatically identified by its occupants, then one or more workers may be dispatched to the vehicle, and may determine whether the vehicle may be associated with a previously placed order, whether the vehicle has arrived at the parking location in error, or whether a malfunction precluding the identification of the vehicle has occurred.

Next, in some other implementations, the interactive parking facilities of the present disclosure may further include a number of signs, indicators and other references that are readily visible and apparent to workers who are instructed to identify and retrieve one or more items previously ordered by a customer from a kiosk or other like location, and to deliver the items to a vehicle designated by or associated with the customer in a predetermined parking location. For example, a kiosk may include one or more computer displays identifying an order and one or more items provided thereon, as well as an identifier of the worker who is to deliver the items to a vehicle, and a location of the vehicle. The kiosk may further include one or more sensors or readers configured to recognize a worker and a bin or a tote containing such items, e.g., an RFID reader equipped to receive one or more signals transmitted by RFID tags affixed to or otherwise associated with the worker or the bin or tote.

In this regard, a kiosk having one or more RFID readers provided thereon or nearby may recognize when a designated worker has arrived at the kiosk in order to retrieve a given item, as intended, based on a confluence of RFID signals received at the RFID readers, and may display relevant information regarding the parking location of the vehicle intended to receive the item, along with instructions to deliver the item to the parking location and the vehicle thereby. Conversely, the kiosk may determine when a worker other than the worker who has been designated to retrieve an item has arrived at the kiosk, and display alternative instructions, or withhold delivery instructions, until the designated worker has arrived.

Likewise, a parking location, such as a parking space, may further include one or more computer displays equipped to display relevant information to a customer or other occupant of a vehicle and also to a worker tasked with delivering items to the vehicle. For example, such a display may welcome a customer to the parking facility and indicate whether the customer has been identified or, alternatively, instruct the customer to identify or authenticate himself or herself according to one or means, such as by logging into an application operating on a handheld device or other computer device. Alternatively, the computer display may inform a customer or other occupant of the vehicle that ordered items associated with the vehicle are being delivered, e.g., by presenting information identifying the worker delivering the items to the vehicle. Moreover, the parking locations may also include sensors or readers for confirming when a worker and one or more ordered items have arrived at the parking location, as well as indicators (e.g., passive lights or other like systems) for identifying a relevant parking location from a distance. The operation of the various interactive features of the kiosks or the parking facilities, including but not limited to one or more of the computer displays or other indicators provided thereon, may be controlled based on the detected presence or absence of one or more predetermined workers, vehicles, occupants and/or items, or on any other basis.

In accordance with the present disclosure, vehicles arriving at a parking facility, workers retrieving or transporting items from a kiosk or other staging area to a vehicle, or bins, totes or other containers of such items may be recognized and identified using any type or form of sensors, such as imaging devices. For example, a parking facility may include one or more imaging devices that operate by capturing light reflected from objects, and by subsequently calculating or assigning one or more quantitative values to aspects of the reflected light, e.g., pixels, generating an output based on such values, and storing such values in one or more data stores. Imaging devices may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust one or more pixel values of an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the values of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Once the characteristics of stationary or moving objects or portions thereof have been recognized in one or more digital images, e.g., within pixel values corresponding to objects within such images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

Other sensors for identifying vehicles, workers, items or other objects may operate based on RFID technology. The term "RFID" refers to a wireless, non-contacting system for transferring data by way of radio frequency electromagnetic fields. In an RFID system, data transfers occur in the form of modulated signals transmitted between an RFID tag (or other type of RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between one and one hundred centimeters, or 1-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present disclosure.

In addition to RFID tags which are automatically coupled with an RFID reader, the systems and methods of the present disclosure may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

Other sensors or readers that may be provided in order to sense the presence of a vehicle, a worker and/or an item, or to identify the vehicle, the worker or the item, may include mechanical switches or other contact sensors associated with scales or other sensors of mass or weight, Near Field Communications (or "NFC") systems, inter-device communications systems such as those operating according to the Bluetooth® protocol (e.g., two or more Bluetooth®-enabled devices connected to one another in an ad hoc piconet or personal access network), magnetometers (e.g., for sensing low-frequency electromagnetic radiation or electric fields, such as the energy emitted by some components of hybrid or electric automobile engines), pneumatic road tube sensors, ultrasonic rangefinders, thermometers, barometric sensors, hygrometers, rain gauges or biometric input devices, e.g., fingerprint readers or palm scanners.

The systems and methods of the present disclosure may further utilize one or more output devices such as computer displays of any type or form. For example, referring again to FIGS. 1A through 1C, one or more of the displays 132-1, 132-2, 132-3 provided on the kiosks 130-1, 130-2, 130-3 or the displays 162-1, 162-2, 162-3 provided at the parking locations 145-1, 145-2, 145-3 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. Such displays may be configured to emit light, to modulate incident light emitted from another source, or both. Alternatively, or additionally, the systems and methods of the present disclosure may further include one or more other output devices for indicating the presence of a vehicle or a customer, or for identifying a vehicle, a worker or a customer, including but not limited to devices having haptic, audible, olfactory or other elements.

Figure 2A:
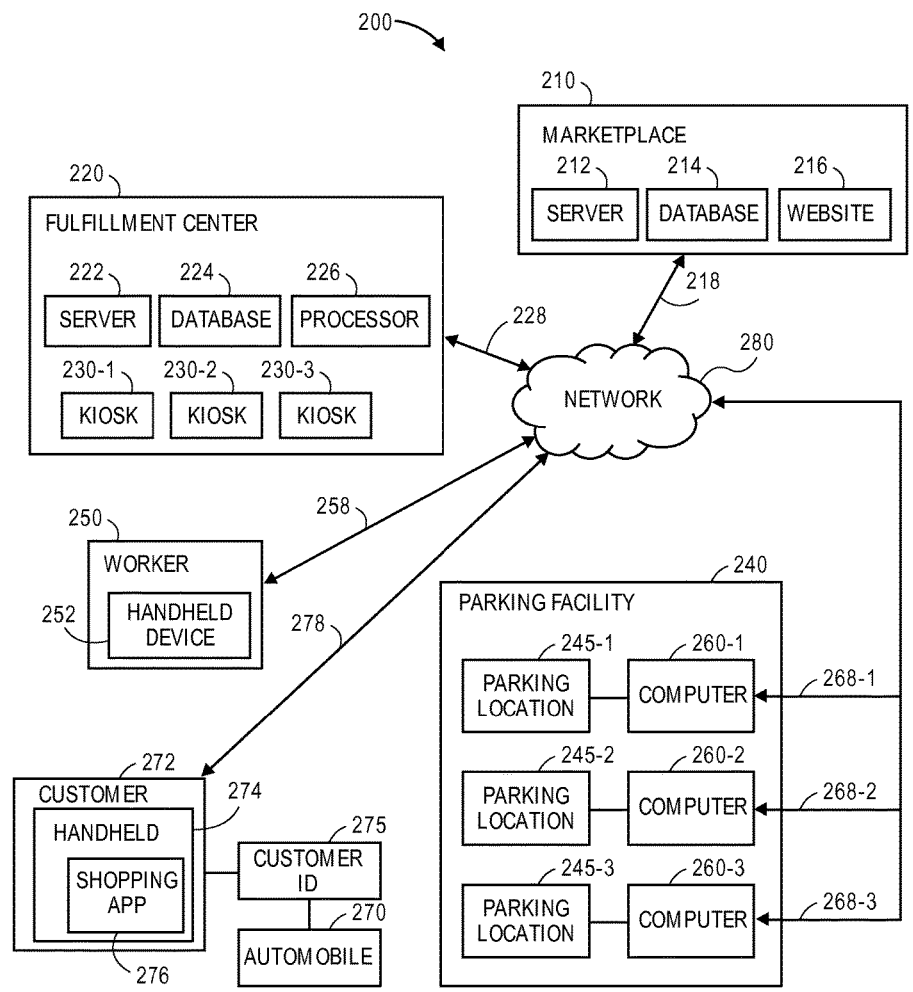
FIGS. 2A through 2C are block diagrams of components of one system including an interactive parking facility in accordance with embodiments of the present disclosure.
Figure 2B:
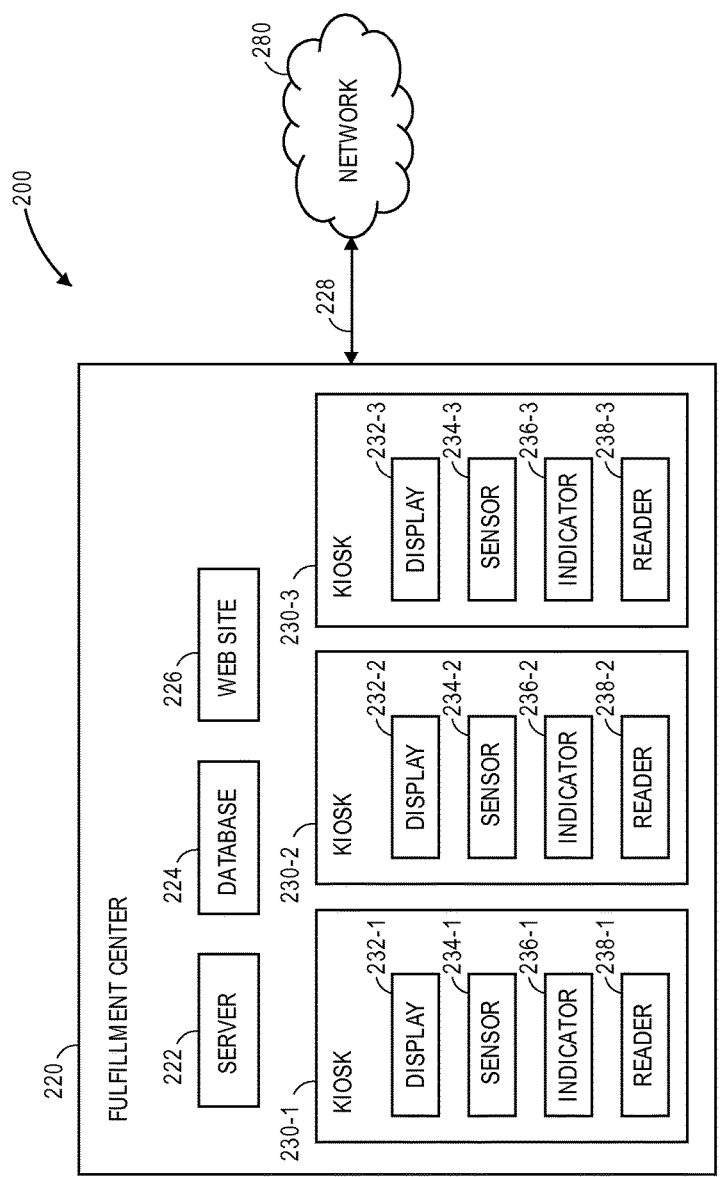
Figure 2C:
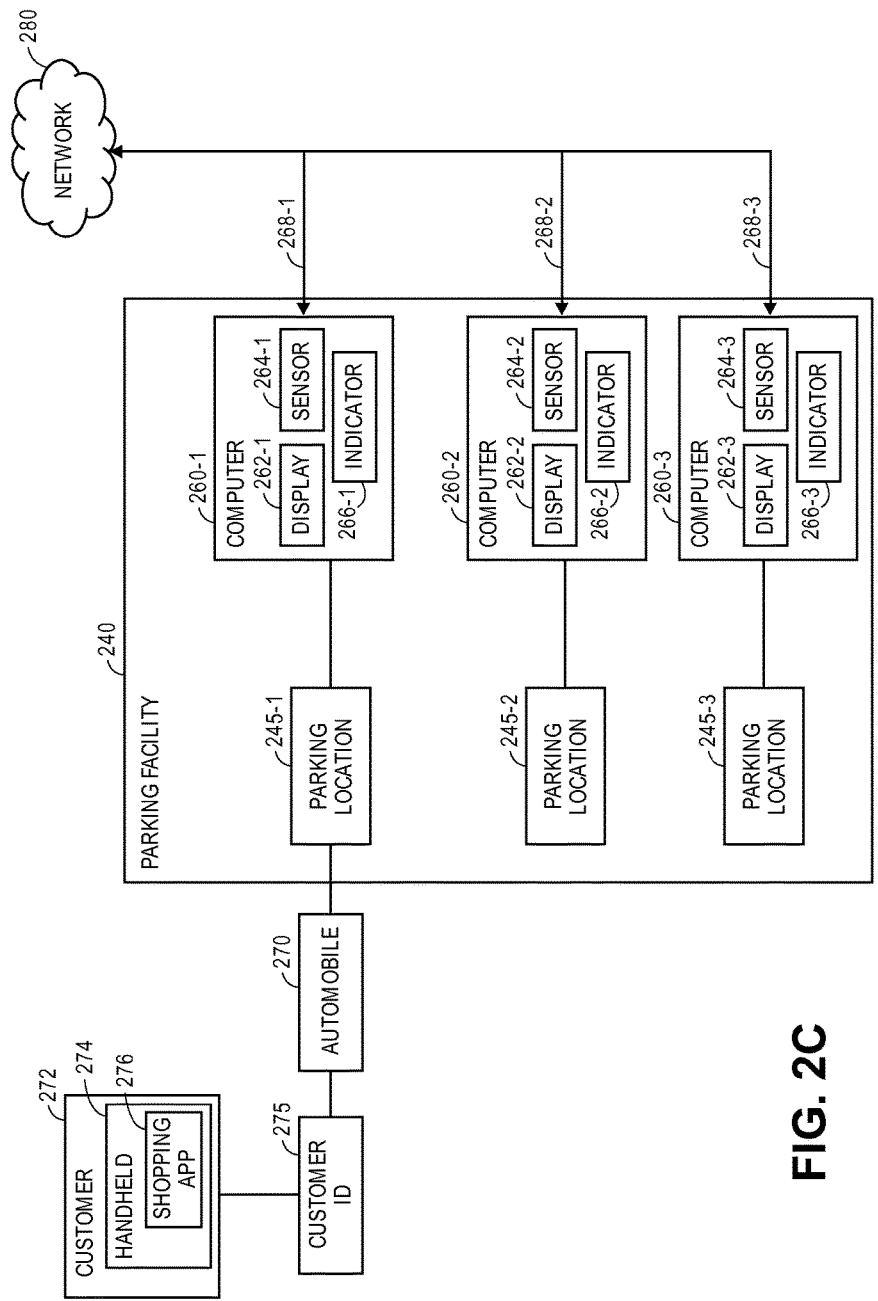

Referring to FIGS. 2A through 2C, a block diagram of components of one system 200 including an interactive parking facility 240 in accordance with embodiments of the present disclosure is shown. The system 200 includes a marketplace 210, a fulfillment center 220, the parking facility 240, a worker 250 and a customer 272 that are or may be connected to one another across a network 280, such as the Internet. Except where otherwise noted, reference numerals preceded by the number "2" shown in FIGS. 2A through 2C indicate components or features that are similar to components or features having reference numerals preceded by the number "1" shown in FIGS. 1A through 1C.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution centers or facilities, including but not limited to the fulfillment center 220. The web site 216 may be implemented using the one or more servers 212, which connect or otherwise communicate with the one or more databases 214 as well as the network 280, as indicated by line 218, through the sending and receiving of digital data. The servers 212 may cause the display of information associated with the web site 216 in any manner, e.g., by transmitting code such as Hypertext Markup Language (HTML), over the network 280 to another computing device that may be configured to generate and render the information into one or more networked resources and to display pages associated with such networked resources on a computer display of any kind. Moreover, the database 214 may include any type of information regarding items that have been made available for sale through the marketplace 210, or ordered by customers from the marketplace 210.

The fulfillment center 220 may be any facility that is adapted to receive, store, process and/or distribute items on behalf of the marketplace 210. As is shown in FIG. 2A, the fulfillment center 220 includes a networked computer infrastructure for performing various computer-related functions associated with the receipt, storage, processing and distribution of such items, including one or more physical computer servers 222, databases (or other data stores) 224 and processors 226, that may be provided in the same physical location as the fulfillment center 210, or in one or more alternate or virtual locations, e.g., in a "cloud"-based environment. The fulfillment center 220 may also include stations for receiving, storing and distributing items to customers, such as one or more receiving stations, storage areas and distribution stations. The fulfillment center 220 further includes a plurality of kiosks 230-1, 230-2, 230-3.

The fulfillment center 220 may maintain or operate one or more order processing and/or communication systems using computer devices in communication with one or more of the server 222, the database 224 and/or the processor 226, or through one or more other computing devices or machines that may be connected to the network 280, as is indicated by line 228, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The fulfillment center 222 may further maintain or perform one or more inventory management functions using computer devices in communication with one or more of the server 222, the database 224 and/or the processor 226. For example, such functions may schedule the arrival, evaluation, storage, preparation or departure of one or more items at the fulfillment center 210, and may further generate information or data in the form of one or more instructions to be provided or otherwise dispatched to workers or other persons associated with worker profiles for retrieving (e.g., picking) items from their respective storage locations and delivering the items to a predefined destination, such as from a storage area to a staging area, or from the staging area to a vehicle in one or more parking locations.

The fulfillment center 220 also includes one or more workers (not shown), who may be any designated personnel tasked with performing one or more tasks within the fulfillment center 220. Such workers may handle or transport items (e.g., any type or form of good, product, media or other tangible consumer article) within the fulfillment center 220, or operate one or more pieces of equipment therein (not shown). The workers may also operate one or more specific computing devices or machines for registering the receipt, retrieval, transportation or storage of items within the fulfillment center 220, or a general purpose device such a personal digital assistant, a digital media player, a smartphone, a tablet computer, a desktop computer or a laptop computer (not shown), including any type or form of handheld or wearable computing device, which may include any form of input and/or output peripherals such as scanners, readers, keyboards, keypads, touchscreens or like components.

Additionally, as is discussed above, the fulfillment center 220 may include one or more receiving stations featuring any apparatuses that may be required in order to receive shipments of items at the fulfillment center 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e g, manned aircraft or unmanned aircraft, such as drones), and preparing such items for storage or distribution to customers. The fulfillment center 220 may also include one or more predefined two-dimensional or three-dimensional storage areas including facilities, for accommodating items and/or containers of such items, such as aisles, rows, bays, shelves, slots, bins, racks, tiers, bars, hooks, cubbies or other like storage means, or any other appropriate regions or stations within an interior of the fulfillment center 220, or outside of or otherwise associated with an exterior of the fulfillment center, e.g., one or more staging areas such as the kiosks 230-1, 230-2, 230-3. The fulfillment center 220 may further include one or more distribution stations where items that have been retrieved from a designated storage area may be evaluated, prepared and packed for delivery from the fulfillment center 220 to addresses, locations or destinations specified by customers, also by way of carriers such as cars, trucks, trailers, freight cars, container ships or cargo aircraft (e.g., manned aircraft or unmanned aircraft, such as drones). Alternatively, an item received at a receiving station of the fulfillment center 220 may be transferred directly to a distribution station for further processing, or "cross-docked," without first being placed into storage in an intermediate storage area.

The kiosks 230-1, 230-2, 230-3 may be any predefined staging areas at which one or more items may be placed in anticipation of their delivery to a vehicle and or a customer, e.g., an automobile (or other vehicle) 270 and/or the customer 272, parked in one of the parking locations 245-1, 245-2, 245-3. One or more items included in an order placed by a customer or another occupant of a vehicle may be deposited at each of the kiosks 230-1, 230-2, 230-3 (e.g., in one or more bins, totes or other carrying devices) by a first associate, and a second associate may deliver the items deposited at one of the kiosks 230-1, 230-2, 230-3 to a vehicle in one or more of the parking locations 245-1, 245-2, 245-3. The kiosks 230-1, 230-2, 230-3 may include or incorporate one or more areas or sectors for maintaining the items therein in one or more predetermined temperature, pressure or other atmospheric conditions, e.g., an ambient temperature storage area, a refrigerated area, a freezer area or a heated area, and any associated controls or other equipment. The kiosks 230-1, 230-2, 230-3 may further include or incorporate access portals (e.g., doors, windows or other openings) which enable items to be transferred from an interior of the fulfillment center 220 directly to one or more of the kiosks 230-1, 230-2, 230-3.

As is shown in FIG. 2B, the kiosks 230-1, 230-2, 230-3 may each include a display 232-1, 232-2, 232-3 (e.g., a monitor or computer display apparatus of any type, kind or form), a sensor 234-1, 234-2, 234-3 (e.g., a device such as a digital camera configured to photograph or otherwise record imaging data of workers, items or any other objects within or within a vicinity of one or more of the kiosks 230-1, 230-2, 230-3, including still or moving images, as well as any relevant audio signals or other information), an indicator 236-1, 236-2, 236-3 (e.g., a passive or active device such as a light for drawing attention to one of the kiosks 230-1, 230-2, 230-3, or for associating the one of the kiosks 230-1, 230-2, 230-3 with one or more of the parking locations 245-1, 245-2, 245-3), or a reader 238-1, 238-2, 238-3 (e.g., a device, such as an RFID reader, configured to receive signals or other information from a corresponding transmitting device, such as a passive or active RFID tag).

One or more of the displays 232-1, 232-2, 232-3, the sensors 234-1, 234-2, 234-3, the indicators 236-1, 236-2, 236-3 and/or the readers 238-1, 238-2, 238-3 may be connected to the server 222 or with one another by way of a wired or wireless connection that may be dedicated or comprise all or part of an internal network (not shown), or with one or more external computing devices via the network 280. Alternatively, or additionally, one or more displays, sensors, indicators or readers may be provided for or in association with two or more of the kiosks 230-1, 230-2, 230-3. For example, a single computer display (e.g., a widescreen television display) that may be partitioned or otherwise configured to present multiple discrete messages or sets of information regarding two or more of the kiosks 230-1, 230-2, 230-3 may be provided. Similarly, a single sensor, such as a digital camera or other imaging device that includes all or portions of two or more of the kiosks 230-1, 230-2, 230-3 within a field of view, may also be provided.

The parking facility 240 may be any type of facility or structure that is configured or provided for the purpose of temporarily housing or parking one or more vehicles, e.g., the automobile 270, in predetermined locations or spaces, e.g., the parking locations 245-1, 245-2, 245-3. For example, the parking facility 240 may be a parking lot, a parking garage, a parking structure, a parking ramp, a parking deck or any like facility or structure having one or more parking surfaces formed from concrete, asphalt, bituminous materials, steel or gravel. The parking facility 240 may include one or more parking locations (e.g., parking spots or parking spaces) located on public or private property, including on sides of public streets (e.g., on-street parking), on public or private lots, or within public or private structures.

The parking locations 245-1, 245-2, 245-3 may be identified or demarcated using any type or form of signage or indicators (such as lines, tapes or other markings on horizontal or vertical surfaces), and may be made available to vehicles or occupants thereof of any type or kind (e.g., general purpose parking locations), or reserved for specific vehicles or occupants thereof (e.g., special purpose parking locations such as handicapped spaces, short-term parking spaces, or spaces that are reserved for a vehicle owned or associated with a specific person or entity). The parking facility 240 may be associated with a single retail establishment, or may be provided for the purpose of temporarily housing or storing vehicles of customers patronizing one or more different retail establishments (e.g., a parking lot outside of a shopping center or a street having parking spaces within a vicinity of a number of restaurants, shops or boutiques).

The parking locations 245-1, 245-2, 245-3 may be sized to accommodate any type or form of vehicle, such as the automobile 270. For example, each of the parking locations 245-1, 245-2, 245-3 may be of a standard size, e.g., approximately nine feet wide and approximately eighteen feet long, or may have different, varying sizes, including but not limited to compact sizes (e.g., spaces expected to accommodate hybrids or other smaller vehicles) of eight feet wide and sixteen feet long, or expanded sizes of ten feet wide and approximately twenty feet long (e.g., spaces expected to accommodate sport-utility vehicles or other larger vehicles). The parking locations 245-1, 245-2, 245-3 may be further sized to accommodate non-standard vehicles of any size, including but not limited to bicycles or boat trailers. Moreover, the parking locations 245-1, 245-2, 245-3 may be aligned parallel to a flow of traffic, perpendicular to the flow of traffic, or at an angle between parallel and perpendicular (e.g., thirty degrees, forty-five degrees or sixty degrees) within the parking facility 240. The parking facility 240 and/or one or more of the parking locations 245-1, 245-2, 245-3 may further include one or more access features or other infrastructure elements, including but not limited to ramps (e.g., straight or helical), curbs, walkways, drainage, landscaping or any other components.

As is shown in FIG. 2C, each of the parking locations 245-1, 245-2, 245-3 may individually or collectively include or be associated with one or more computers 260-1, 260-2, 260-3 or other computer devices having a variety of components. For example, as is shown in FIG. 2C, each of the computers 260-1, 260-2, 260-3 associated with the parking locations 245-1, 245-2, 245-3 may include a display 262-1, 262-2, 262-3, a sensor 264-1, 264-2, 264-3, an indicator 266-1, 266-2, 266-3 and/or a reader 268-1, 268-2, 268-3. The displays 262-1, 262-2, 262-3 may be provided and/or aligned to display information of any type or form to an occupant of a vehicle in one or more of the parking locations 245-1, 245-2, 245-3 (e.g., the automobile 270), or a worker delivering items to one or more of the parking locations 245-1, 245-2, 245-3 (e.g., the worker 250). The sensors 264-1, 264-2, 264-3 may be further provided and/or aligned to capture information of any type or form regarding one or more vehicles or occupants thereof within the parking locations 245-1, 245-2, 245-3, or one or more workers delivering items to or departing from one or more of the parking locations 245-1, 245-2, 245-3. The indicators 266-1, 266-2, 266-3 may be active or passive elements (e.g., lights) that may, when energized or otherwise activated, present information to occupants of a vehicle or to a worker regarding the fulfillment and/or delivery of an order associated with the vehicle. The readers 268-1, 268-2, 268-3 may be any devices, e.g., RFID readers, configured to receive signals or other information from a corresponding transmitting device, such as a passive or active RFID tag, associated with one or more vehicles, occupants thereof, or workers.

The worker 250 may be any designated personnel tasked with performing one or more tasks within the fulfillment center 220. The worker 250 may handle or transport items within the fulfillment center 220 (e.g., by delivering items from a storage area within the fulfillment center 220 to one or more of the kiosks 230-1, 230-2, 230-3) or outside of the fulfillment center 220 (e.g., by delivering items from one or more of the kiosks 230-1, 230-2, 230-3 to a vehicle in one or more of the parking locations 245-1, 245-2, 245-3), or operate one or more pieces of equipment therein. The worker 250 may also operate one or more specific computing devices for registering the receipt, retrieval, transportation or storage of items within the fulfillment center 220, or a general purpose device, e.g., the handheld device 252, which may be a personal digital assistant, a digital media player, a smartphone, a tablet computer or a laptop computer, or any other type or form of computer device that may be carried or operated by hand or worn. The handheld device 252 may be associated or communicate with one or more of the server 222, the data store 224 or the processor 226, or with one or more other computer devices that may be accessed via the network 280. The worker 250 may interact with such computer devices using any type or number of input or output devices. Additionally, the worker 250 may wear, carry or otherwise be associated with or adorned with an RFID tag (not shown) or other device or component that may emit a unique signal associated with the worker 250 when the worker 250 is within range of a reading system, such as one or more of the readers 238-1, 238-2, 238-3 or the readers 268-1, 268-2, 268-3. The worker 250 may travel on foot throughout the fulfillment center 220 and/or the parking facility 240, or may travel on one or more wheeled apparatuses, such as a pair of skates or a personal transporter vehicle.

The automobile 270 may be any type of traveling apparatus that may transport at least the customer 272 from an origin to the parking facility 240, that may be parked in one or more of the parking locations 245-1, 245-2, 245-3, and that may transport at least the customer 272 and/or one or more items from the parking facility 240 to a destination. For example, those of ordinary skill in the pertinent arts will recognize that the automobile 270 may be a wheeled apparatus powered by any type of motor, engine or other prime mover in whole or in part such as a car, a truck, a minivan, a motorcycle or an all-terrain vehicle, or a wheeled apparatus powered by human power, such as a bicycle, a scooter or a skateboard.

The customer 272 may be any entity or individual that intends to purchase, rent, lease, borrow or otherwise obtain items (e.g., goods, products, services or information of any type or form) from the marketplace 210 or from another source (e.g., a manufacturer, a merchant, a seller or a vendor), and to travel to the parking facility 240 in the automobile 270 to receive such items. The customer 272 may utilize one or more computing devices, such as a handheld device 274 or any other like machine that may operate or access one or more software applications, such as a web browser (not shown) or a shopping application 276, and may be connected to or otherwise communicate with the marketplace 210, the fulfillment center 220, or one or more of the computers 260-1, 260-2, 260-3 associated with the parking locations 245-1, 245-2, 245-3 through the network 280, as indicated by line 278, by the transmission and receipt of digital data. Moreover, as is shown in FIG. 1A, the customer 272 may receive deliveries of items from the fulfillment center 220 and/or one or more of the kiosks 230-1, 230-2, 230-2 by the worker 250. Alternatively, such items may be delivered to an occupant of the automobile 270 who may or may not be the customer 272 (e.g., an individual designated by a customer who ordered the items and requested that the individual travel to the parking facility 240 via the automobile 270 to retrieve the ordered items).

The automobile 270 and/or the customer 272 may be associated with a customer identifier 275, which may be any type or form of alphanumeric characters or symbols provided in one or more strings or sets. For example, the customer 272 may maintain an account with the online marketplace 210, and the customer identifier 275 may be a text-based user name, an account number or another set of letters, numbers or symbols by which the online marketplace 210 references the customer 272 and/or one or more items ordered by the customer 272. The letters, numbers or symbols of the customer identifier 275 may define a single word, term or number, include multiple words, terms or numbers that may be separated by spaces, punctuation marks or other symbols, or truncated together.

The customer identifier 275 may, therefore, act as a functional link between the automobile 270 or one or more occupants thereof and one or more orders for items placed by the customer 272, or the ordered items themselves. For example, the customer identifier 275 may be stored along with other information regarding the customer 272 or the automobile 270, including but not limited to a license plate number, a make or a model of the automobile 270, in one or more data stores. When the automobile 270 is automatically recognized upon its arrival at the parking facility 240, the customer identifier 275 may be identified, and information regarding any outstanding orders placed by the customer 272 or otherwise associated with the automobile 270 may be retrieved from one or more storage areas. Alternatively, if the automobile 270 is not automatically recognized upon arriving at the parking facility 240, the customer 272 may identify himself or herself as being associated with the customer identifier 275, e.g., by performing one or more authentication processes using the handheld device 274 (e.g., by accessing one or more networked resources such as web pages and entering a user name and/or password, or satisfying one or more predetermined criteria), or may be identified as being associated with the customer identifier 275 by one or more workers (e.g., the worker 250). Those of ordinary skill in the pertinent arts will recognize that the methods or manners in which the automobile 270 or the customer 272 may be identified or otherwise recognized as being associated with the customer identifier 275 in accordance with the present disclosure are not limited.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center," a "kiosk," a "parking facility" or "parking location," a "worker," a "vehicle" or a "customer," or like terms, may be automated steps performed by their respective computer systems, or implemented within software modules (or computer programs) executed by one or more general purpose computers. Moreover, those of ordinary skill in the pertinent arts would recognize that references to process steps or actions described herein as being performed by or relating to a "marketplace" or a "fulfillment center" could also be performed by or relate to a manufacturer, a merchant, a seller or a vendor, or another source of items. Those of ordinary skill in the pertinent arts would also recognize that process steps described as being performed by a "marketplace," a "fulfillment center," a "kiosk," a "parking facility" or "parking location," a "worker," a "vehicle" or a "customer" may be typically performed by a human operator, but could, alternatively, be performed by an automated agent.

The marketplace 210, the fulfillment center 220, the kiosks 230-1, 230-2, 230-3, the parking facility 240, the worker 250, the automobile 270 and/or the customer 272 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 222 may be adapted to transmit information or data in the form of synchronous or asynchronous messages from the fulfillment center 220 to the server 212, the laptop computer 222, one or more of the kiosks 230-1, 230-2, 230-3, the handheld device 252, one or more of the computers 260-1, 260-2, 260-3, the handheld device 274 or any other computer device associated with the worker 250 or a worker profile associated with the worker 250 in real time or in near-real time, or in one or more offline processes, via the network 280.

Additionally, those of ordinary skill in the pertinent art would further recognize that the marketplace 210, the fulfillment center 220, the kiosks 230-1, 230-2, 230-3, the parking facility 240, the worker 250 or the customer 270 may operate any of a number of computing devices that are capable of communicating over the network 280, including but not limited to set-top boxes, personal digital assistants, digital media players, web pads, laptop computers, desktop computers, electronic book readers, and the like. Those of ordinary skill in the pertinent arts will further recognize that the computers 260-1, 260-2, 260-3 may include or comprise any type of computing device, as well. The protocols and components for providing communication between such devices are well known to those skilled in the art of computer communications and need not be described in more detail herein.

The data and/or computer executable code, logic, instructions, programs, firmware, software and the like (also referred to herein as "computer executable" components) described herein may be stored on a computer-readable medium that is within or accessible by computers or computer components such as the server 212, the server 222, the handheld device 252, the computers 260-1, 260-2, 260-3 or the handheld device 274, or any other computers or control systems utilized by the marketplace 210, the fulfillment center 220, the kiosks 230-1, 230-2, 230-3, the parking facility 240, the worker 250 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer-readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
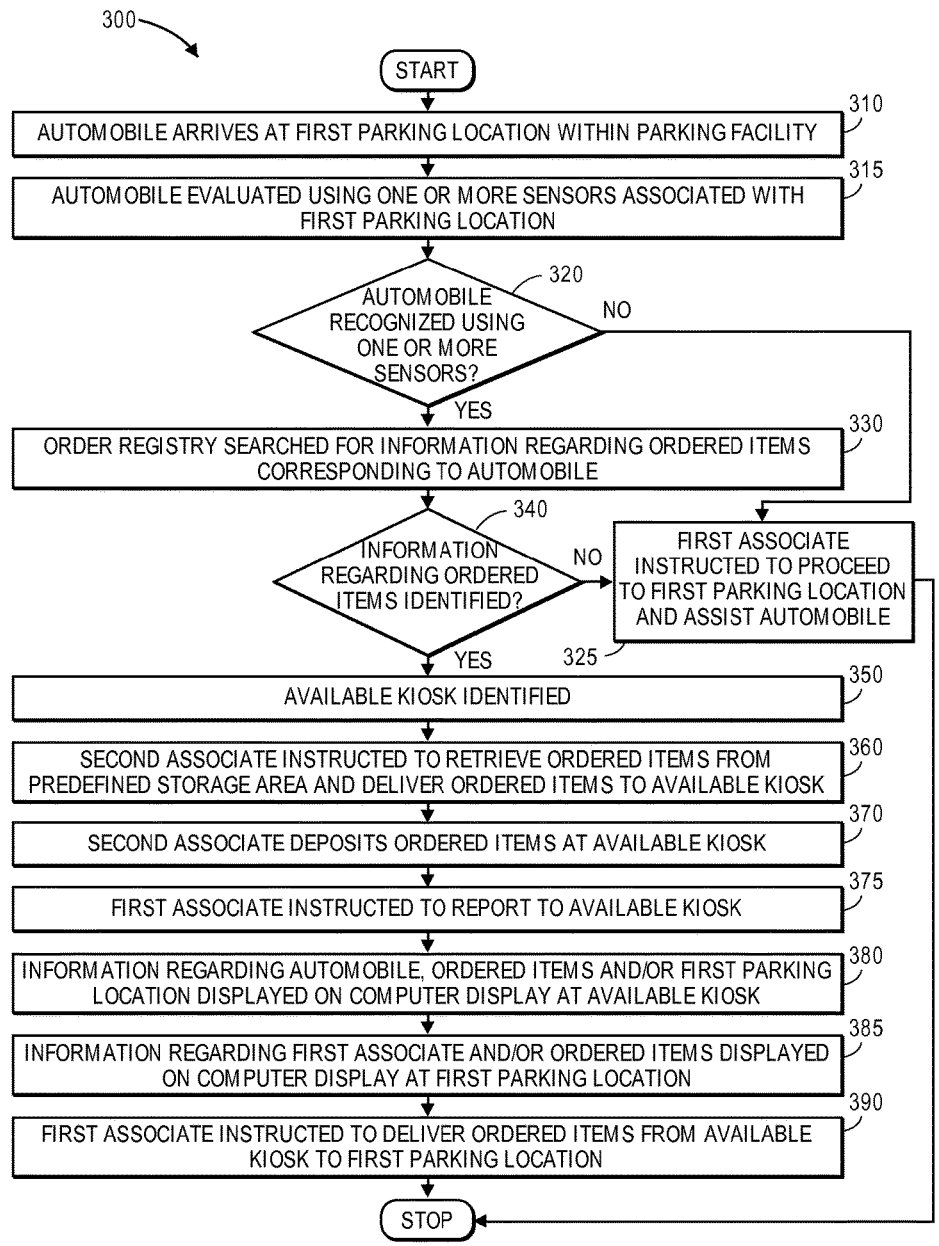
FIG. 3 is a flow chart of one process for fulfilling an order in an interactive parking facility in accordance with embodiments of the present disclosure.

Referring to FIG. 3, a flow chart 300 representing one process for fulfilling an order in an interactive parking facility in accordance with embodiments of the present disclosure is shown. At box 310, an automobile arrives at a first parking location within a parking facility. The automobile may be any type of vehicle, such as a car, a truck or the like, and may have any number of passengers therein. For example, referring again to FIG. 1A, the vehicle 170 (e.g., a car) and a driver 172 may arrive at the parking facility 140 and park in a parking location 145-2. At box 315, the automobile is evaluated using one or more sensors associated with the first parking location. In some implementations, the sensors may include imaging devices configured to capture imaging data from one or more aspects of the automobile, including a license plate or other identifiable markings thereon, or a frame or body of the automobile itself.

At box 320, whether the automobile is recognized using one or more sensors is determined. For example, if a license plate or other identifier on the automobile is identified and interpreted, information regarding the license plate (e.g., the letters and/or numbers thereon) or other identifier may be compared against a look-up table or other record of customer information in order to determine whether the automobile is a customer of the fulfillment center or other retail establishment associated with the parking facility. If the automobile is not recognized, then the process advances to box 325, where a first associate is instructed to proceed to the first parking location and to assist the automobile, and the process ends. For example, a worker may approach the automobile and inquire of the occupant as to whether the occupant is a customer of a retail establishment associated with the parking facility (e.g., where the occupant has arrived in a new car or has yet to register the car with the retail establishment), whether the occupant is a newcomer to the retail establishment, or whether the occupant is otherwise lost).

If the automobile is recognized, then the process advances to box 330, where an order registry is searched for information regarding one or more ordered items corresponding to the automobile. For example, the automobile may be identified and associated with a customer identifier or one or more customers or customer accounts at a retail establishment, and a list of orders previously received from customers may be searched in order to determine whether an order was received from a customer associated with the automobile, or whether an order was otherwise placed by a customer account associated with the automobile. At box 340, if no information regarding ordered items corresponding to the automobile is identified, then the process advances to box 325, where the first associate is instructed to proceed to the first parking location and to assist the automobile, and the process ends.

If information regarding one or more ordered items corresponding to the automobile is identified, then the process advances to box 350, where an available kiosk or other staging area is identified. For example, referring to FIG. 1C, the status of the kiosks 130-1, 130-2, 130-3 may be determined, e.g., based on signals or other information received from the sensors 134-1, 134-2, 134-3 or by any other means, and one of the kiosks may be identified as being available to accommodate the ordered items associated with the automobile for which information was identified at box 330.

At box 360, after having recognized the automobile, identified information regarding ordered items associated with the automobile, and identified an available kiosk, the a second associate is instructed to retrieve the ordered items from one or more predefined storage areas, and to deliver the ordered items to the available kiosk. The second associate may be instructed to retrieve the ordered items by any method, including but not limited to one or more electronic messages, such as e-mail messages, sent to a handheld or wearable computing device operated by the second associate, or to such a device associated with a worker profile of the second associate. At box 370, the second associate deposits the ordered items at the available kiosk. For example, a worker within the fulfillment center (e.g., a "picker") may retrieve the ordered items from inventory, e.g., from one or more bays, shelves, slots, racks, tiers, bars, hooks, cubbies or other like storage facilities or, alternatively, may identify a bin, a tote or another carrying device including the ordered items, and may transport the ordered items to the available kiosk. The ordered items may be passed through a door, a window or another opening from the fulfillment center to the available kiosk, or carried outside the fulfillment center to the available kiosk.

At box 375, the first associate is instructed to report to the available kiosk. For example, upon confirming that the items delivered by the second associate have arrived at the available kiosk, the first associate may be informed via an electronic message transmitted to a handheld device operated by the first associate, e.g., the handheld device 252 operated by the worker 250 of FIG. 2A, or associated with a worker profile of the first associate. Alternatively, the first associate may be notified via one or more signals provided on a display associated with the available kiosk, or one or more sounds played by the display, e.g., one of the displays 132-1, 132-2, 132-3 shown in FIG. 1C, or by any other audible, visual, haptic or other means known to those of ordinary skill in the pertinent arts. The first associate may be selected at random, based on any prior experience with the automobile or the occupant thereof, or on any other relevant basis (e.g., where the ordered items are particularly large or heavy, a worker capable of lifting or carrying the ordered items to the vehicle may be selected). Alternatively, once a vehicle has been identified, a worker may be selected to aid and assist the vehicle where the occupant of the vehicle has expressed a preference for or otherwise designated the worker as his or her preferred associate for delivering items.

At box 380, information regarding the automobile, the ordered items and/or the first parking location is displayed on a computer display at the available kiosk. For example, referring again to FIG. 1C, the display 132-1 at the kiosk 130-1 identifies the customer intended to receive the item 10 and the first associate, and includes an image of the vehicle 170 at the parking location 145-2. Additionally, the central one of the indicators 136-1A, 136-1B, 136-1C is lit, indicating that the central one of the parking locations 145-1, 145-2, 145-3 is where the vehicle 170 is located. At box 385, information regarding the first associate and/or the ordered items are displayed on a computer display at the first parking location. For example, referring again to FIG. 1B, information indicating that the ordered items are being displayed to the vehicle 170 at the parking location 145-2 and identifying the first associate (e.g., a name and an image of the first associate), may be displayed on the display 162-2, along with words, symbols or other indicators that the delivery of the ordered items to the vehicle 170 is imminent. In this regard, the customer 172 is notified that his or her order is arriving shortly, and may view an image of the first associate delivering the items, so that the customer may confirm that a worker approaching the vehicle 170 is the first associate and is carrying the ordered items, but refuse to open his or her door or trunk or otherwise communicate with anyone who may approach the vehicle 170 other than the first associate.

At box 390, the first associate is instructed to deliver the ordered items from the available kiosk to the first parking location, and the process ends. The instruction to deliver the ordered items may be targeted to the first associate in particular, or to a worker profile of the first associate, and displayed on a display at the available kiosk, e.g., one of the displays 132-1, 132-2, 132-3 at the kiosks 130-1, 130-2, 130-2 of FIGS. 1A and 1C, or otherwise provided to the first associate in any manner. Alternatively, the instruction to deliver the ordered items may be directed to any available associate, or to worker profiles of one or more associates. Moreover, as is also shown in FIG. 1B, the indicator 166-2 is illuminated, thereby enabling the first associate to find the parking location 145-2 and the vehicle 170 from a distance.

As is discussed above, some embodiments of the interactive parking facilities of the present disclosure may present relevant information regarding vehicles or customers associated with one or more orders for items, or regarding workers tasked with delivering such ordered items to the vehicles or occupants thereof, on one or more computer displays within a vicinity of a parking location. For example, one or more sensors (e.g., digital cameras or other devices) may detect that a vehicle has arrived at a parking facility affiliated with one or more retail establishments, and attempt to identify the vehicle. Once the vehicle has been identified, an order associated with the vehicle (e.g., an order placed by an owner or occupant of the vehicle) may be automatically identified, and one or more items included in the order may be retrieved and delivered to the vehicle by one or more workers who may be guided to the location of the vehicle based on information presented on one or more interactive displays. Likewise, an occupant of a vehicle may be informed that his or her vehicle has been recognized, and that his order is being retrieved, prepared and/or delivered to his or her location, via information presented on the one or more interactive displays. If the vehicle may not be identified using the one or more sensors, however, a worker may be dispatched to the vehicle, in an attempt to identify the occupant thereof and determine whether the occupant or another individual associated with the vehicle has previously placed an order for one or more items with a retail establishment. The worker may be guided to the location of the unidentified vehicle and/or occupant by information presented on the one or more interactive displays or by one or more passive indicators (e.g., an illuminator).

Referring to FIGS. 4A through 4G, a system 400 including an interactive parking facility 440 in accordance with embodiments of the present disclosure is shown. Except where otherwise noted, reference numerals preceded by the number "4" shown in FIGS. 4A through 4G indicate components or features that are similar to components or features having reference numerals preceded by the number "2" shown in FIGS. 2A through 2C, or by the number "1" shown in FIGS. 1A through 1C.

The system 400 includes a plurality of kiosks 430-1, 430-2, 430-3, and the parking facility 440 having a plurality of parking locations 445-1, 445-2, 445-3. Additionally, the parking facility 440 further includes a plurality of sensors 464-1, 464-2, 464-3 (e.g., a digital camera or other imaging device) that are aligned to capture information regarding activity occurring at the parking facility 440 within their respective ranges, including activity occurring within each of the respective parking locations 445-1, 445-2, 445-3.

Figure 4A:
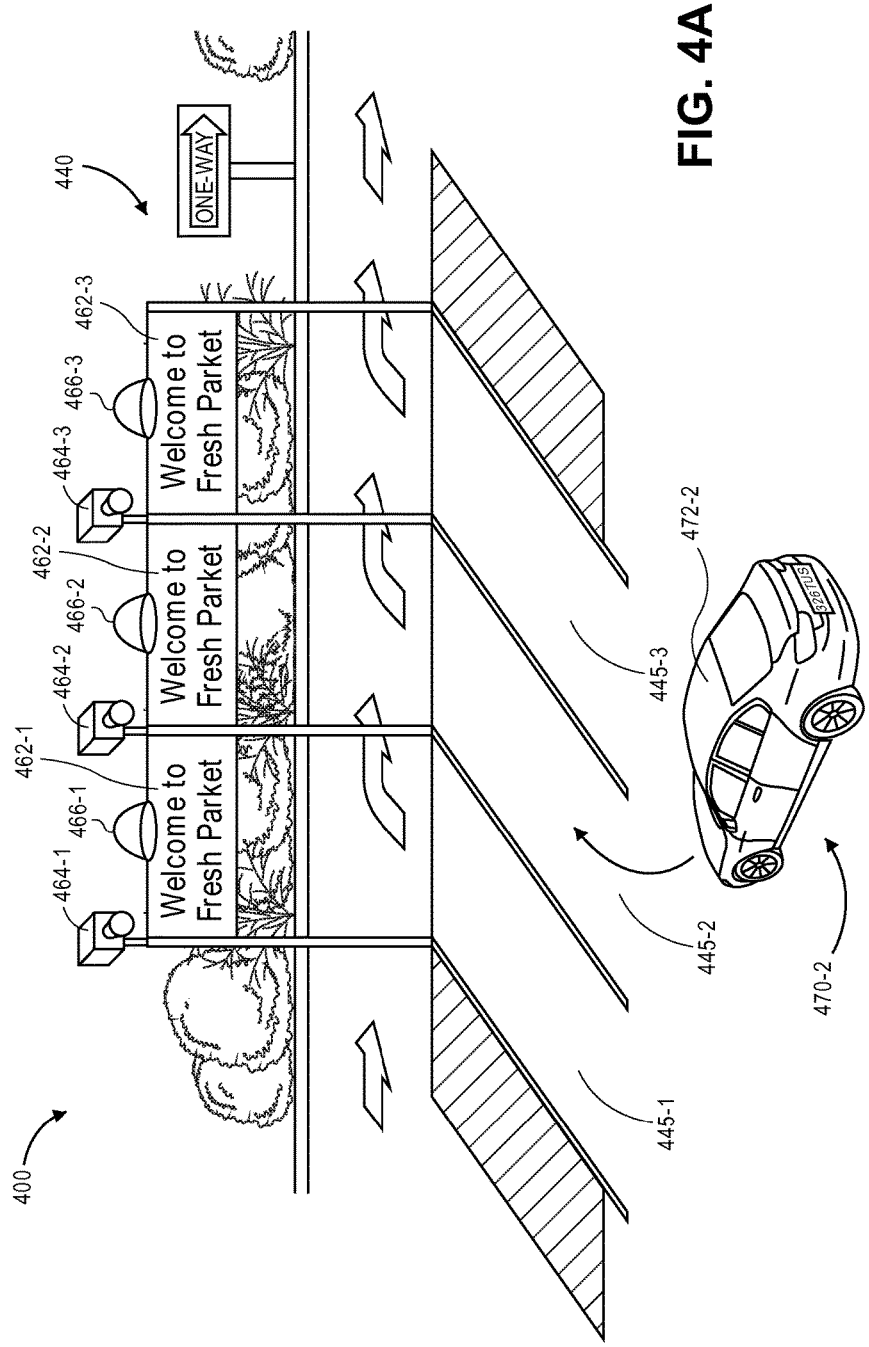

As is shown in FIG. 4A, when vehicle 470-2 arrives at the parking facility 440, an occupant 472-2 of the vehicle 470-2 may select from any number of available parking locations 445-1, 445-2, 445-3, and park the vehicle 470-2 there. The sensor 464-2 may recognize that the vehicle 470-2 has arrived and is parked in the parking location 445-2 by any means. For example, where the sensor 464-2 is an imaging device such as a digital camera, the sensor 464-2 may capture imaging data in the form of still or moving images and any relevant audio signals or metadata from the parking facility 440, and may recognize one or more outlines, contours, edges or other attributes of the vehicle 470-2 within the lines or other markings defining the bounds of the parking location 445-2. Alternatively, where the sensor 464-2 is a depth sensor, the arrival of a vehicle may be generally confirmed based on a change in a depth profile associated with the parking location 445-2. Other types of sensors may also determine the arrival of a vehicle, such as a contact or pressure sensor embedded within one or more surfaces of the parking facility 440, which may sense the weight of an arriving vehicle, or one or more acoustic or light sensors, which may "hear" or "see" an arriving vehicle, and provide one or more indications thereby.

Upon determining that a vehicle has arrived, the systems and methods of the present disclosure may attempt to determine which vehicle has arrived by comparing attributes identified from information or data captured by one or more sensors against one or more records of attributes of known vehicles maintained in a data store. If a matching set of attributes is identified, the information or data captured by a sensor may be determined to correspond to the particular vehicle having the matching set of attributes. For example, a license plate may be identified within imaging data captured from a parking facility, and one or more alphanumeric characters and/or symbols within the license plate may be interpreted and associated with one or more customer identifiers.

As is discussed above, when a vehicle is identified within a location of a facility, e.g., a parking space in a parking facility, whether the vehicle or an occupant thereof is associated with a previously received order for one or more items may be determined, for example, by identifying a customer identifier associated with the vehicle or the occupant. If an order for one or more items is associated with the customer identifier, instructions for identifying, retrieving and preparing the items for delivery to the vehicle may be provided to one or more workers. For example, the instructions may be provided in the form of one or more electronic messages to one or more computer devices or accounts associated with a worker profile (e.g., a set of data associated with a given worker, or with a class of one or more workers, including one or more characteristics or attributes of the worker or workers).

Figure 4B:
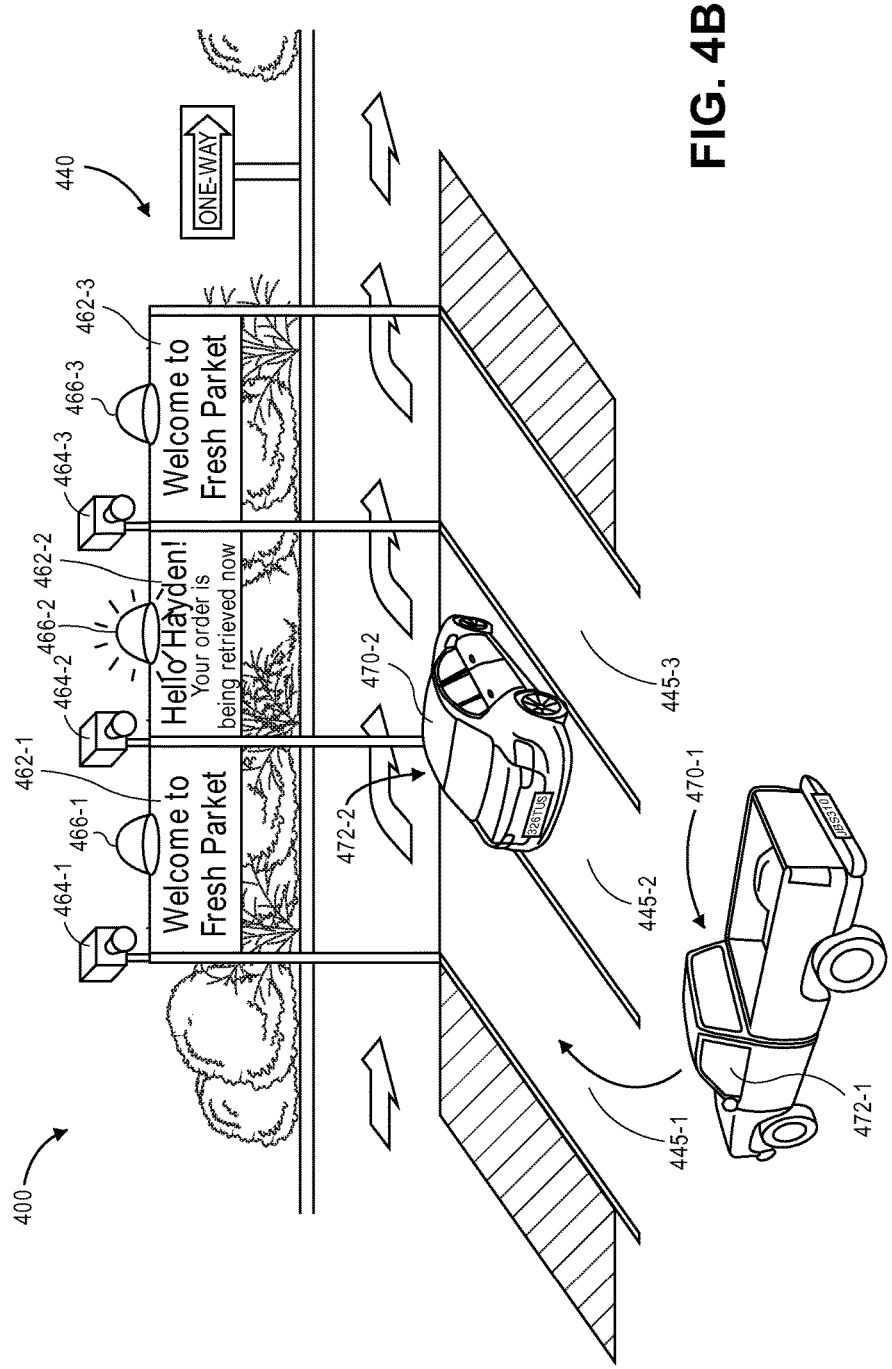

Meanwhile, information regarding the vehicle and/or one or more occupants thereof may be displayed at on a computer display at the facility. Referring to FIG. 4B, the vehicle 470-2 is shown as within the parking location 445-2, and information regarding an order associated with the vehicle 470-2 or an occupant 474-2 thereof and a status of the order is displayed on the computer display 462-2. For example, the computer display 462-2 identifies the occupant 472-2 of the vehicle 470-2 (viz., Hayden) and displays a status of an order associated with the occupant 472-2 (e.g., that the order is being retrieved). The indicator 466-2 associated with the parking location 445-2 is also illuminated. Additionally, as is also shown in FIG. 4B, another vehicle 470-1 is shown as arriving at the parking location 445-1.

As is also discussed above, when a vehicle is recognized as having arrived at a location, e.g., a parking space at a parking facility, but is not automatically identified, such as by one or more sensors provided at the facility, an occupant of the vehicle may be prompted to identify himself or herself, or otherwise identify the vehicle, in one or more other ways. For example, the occupant may be prompted to authenticate himself or herself via one or more electronic means, such as by accessing one or more networked resources or other electronic systems associated with the fulfillment center and entering a user name and/or password, or satisfying one or more predetermined criteria. Once an occupant of the vehicle has identified himself or herself electronically, a customer identifier associated with the vehicle and/or the occupant may be determined, and instructions for identifying, retrieving and preparing the items for delivery to the vehicle may be provided to one or more workers, e.g., to one or more devices or accounts associated the workers, or with one or more worker profiles.

Figure 4C:
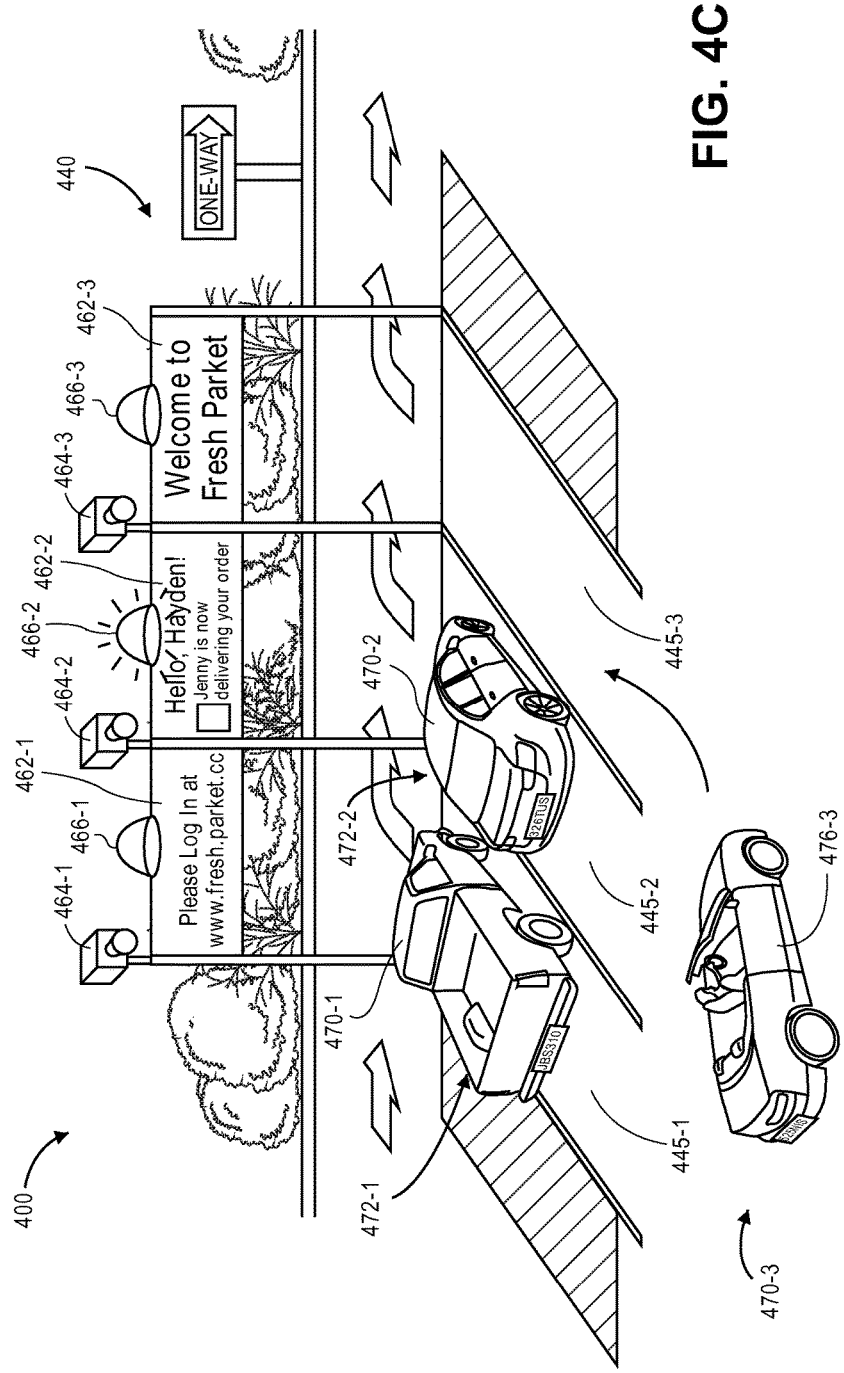

Referring to FIG. 4C, the vehicle 470-1 is shown as within the parking location 445-1, and a prompt including a Uniform Resource Locator (URL), a Uniform Resource Indicator (URI) or a domain name for accessing a network page associated with a fulfillment center is displayed on the computer display 462-1. Thus, an occupant 472-1 of the vehicle 470-1 may authenticate himself or herself by accessing the network page, and providing a user name and/or password, or satisfying one or more other predetermined criteria. Once the occupant 472-1 has been authenticated, an order for one or more items associated with the occupant 472-1 or the vehicle 470-1 may be identified, and the items included in the order may be retrieved. Additionally, as is also shown in FIG. 4C, an updated status of the order associated with the vehicle 470-2 or the occupant 472-2 is shown on the computer display 462-2, including an identity of a worker (viz., Jenny) who will be delivering the items included in the order to the vehicle 470-2.

Figure 4D:
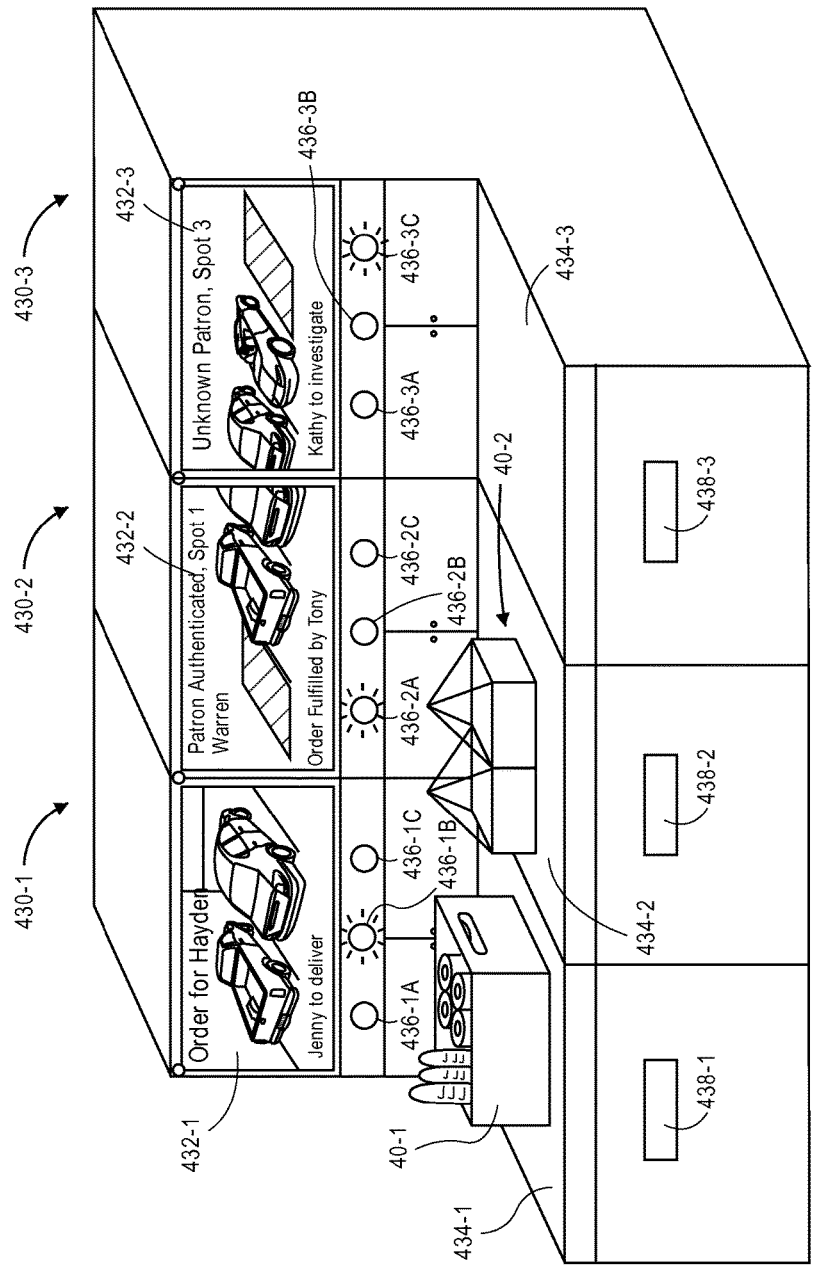

As is discussed above, information regarding one or more vehicles at an interactive parking facility may be presented on one or more computer displays at a kiosk or other staging area where items may be deposited prior to delivery to the one or more vehicles. At such kiosks or other staging areas, one or more workers may view information regarding the status of the various parking locations at the parking facility and the vehicles therein or operators thereof, information regarding the items included in the orders, instructions for delivering the items to the vehicles, or any other relevant information or data. Referring to FIG. 4D, the plurality of kiosks 430-1, 430-2, 430-3 are shown. The kiosk 430-1 includes a bin 40-1 having a plurality of ordered items provided therein. An image of the vehicle 470-2 to which the bin 40-1 and the items are to be delivered is provided on a computer display 432-1, along with information identifying the occupant 472-2 (viz., Hayden) of the vehicle 470-2 associated with the items in the bin 40-1, and the worker (viz., Jenny) tasked with delivering the items to the vehicle 470-2 at the parking location 445-2. The indicator 436-1B on the kiosk 430-1, which corresponds to the parking location 445-2, is lit while the indicators 436-1A, 436-1C corresponding to the parking locations 445-1, 445-3 are not lit.

Similarly, the kiosk 430-2 also includes a bin 40-2 having a plurality of ordered items provided therein. An image of the vehicle 470-1 to which the bin 40-1 is to be delivered is provided on a computer display 432-2, along with information indicating that the occupant 472-1 (viz., Warren) who ordered the items in the bin 40-2 has been identified, and information identifying the worker (viz., Tony) who fulfilled the order for the items in the bin 40-2. The indicator 436-2A on the kiosk 430-2 corresponding to the parking location 445-1 is lit, while the indicators 436-2B, 436-2C corresponding to the parking locations 445-2, 445-3 are not lit.

The kiosk 430-3, however, does not include any bins or ordered items thereon. An image of the vehicle 470-3 within the parking location 445-3 is shown on a computer display 432-3, along with information indicating that the vehicle 470-3 and/or the occupant 472-3 thereof have not been identified. The computer display 432-3 further identifies a worker (viz., Kathy) tasked with approaching the vehicle 470-3 at the parking location 445-3, and the indicator 436-3C, corresponding to the parking location 445-3, is also lit, while the indicators 436-3A, 436-3B corresponding to the parking locations 445-1, 445-2 are not lit.

As is further discussed above, when a vehicle parked within a parking location of an interactive parking facility according to the present disclosure may not be automatically identified, e.g., by one or more sensors, and an occupant of the vehicle is unable to authenticate himself or herself, or an order associated with the occupant or the vehicle may not be identified, a worker profile may be provided with one or more instructions and tasked with approaching the vehicle to determine whether the occupant requires assistance, or inquiring as to whether the occupant is a customer of a retail establishment associated with the parking facility.

Referring to FIG. 4E, the vehicles 470-1, 470-2, 470-3 are shown at the parking locations 445-1, 445-2, 445-3. A worker 450-1 is delivering the items 40-1 to the vehicle 470-2 in the parking location 445-2, and information regarding the statuses of the orders associated with the vehicles 470-1, 470-2 is displayed on the computer displays 462-1, 462-2 at the parking locations 445-1, 445-1. For example, the computer display 462-1 indicates that an order for items associated with the vehicle 470-1 or the occupant 472-1 is being retrieved, while the computer display 462-2 indicates that an order for items, viz., the items 40-1, is being delivered to the vehicle 470-2, and identifies the worker 450-1. The indicators 466-1, 466-2 are lit, indicating that the vehicles 470-1, 470-2 have been identified and that orders associated with such vehicles 470-1, 470-2 are being processed. However, as is shown in FIG. 4E, the vehicle 470-3 and/or an occupant 472-3 thereof has not been identified. Therefore, a computer display 462-3 associated with the parking location 445-3 indicates that a worker will be reporting to the parking location 445-1 shortly, and the indicator 466-3 is not lit.

Referring to FIG. 4F, the vehicles 470-1, 470-3 are shown at the parking locations 445-1, 445-3, and the vehicle 470-2 is shown as departing from the parking location 445-2 after having received the items 40-1 from the worker 450-1. Additionally, the indicator 466-1 is lit, while the indicators 466-2, 466-3 are not lit. The computer display 462-1 includes an updated status of the order associated with the occupant 472-1 or the vehicle 470-1, and identifies a worker 450-2 (viz., Steve) who is delivering the ordered items 40-2 to the vehicle 470-1. The computer display 462-2 includes a departure message to the occupant 472-2 of the vehicle 470-2. The computer display 462-3 informs the occupant 472-3 of the vehicle 470-3 that a worker 450-3 has arrived, e.g., with a handheld device 452-3, to determine whether the occupant 472-3 requires assistance, or whether the occupant 472-3 has placed an order with a retail establishment associated with the parking facility 440.

The worker 450-3 may identify the vehicle 470-3 or the occupant 472-3 in any manner. For example, where the occupant 472-3 is an existing customer at a retail establishment associated with the parking facility 440, and has recently purchased the vehicle 470-3, or has otherwise arrived at the parking facility 440 with the vehicle 470-3 for the first time, the worker 450-3 may review registration or licensing information relating to the vehicle 470-3, and may enter information associating with the vehicle 470-3 with a customer identifier associated with the occupant 472-3 or another individual into one or more databases or data stores using the handheld device 452-3.

Likewise, where a customer identifier associated with the occupant 472-3 or the vehicle 470-3 has expired, the worker 450-3 may ask the occupant 472-3 to verbally or automatically authenticate himself or herself using the handheld device 452-3, such as by presenting the occupant 472-3 with one or more predetermined security questions (e.g., a mother's maiden name, a pet's name, or a primary school attended by the occupant 472-3), to be answered in order to authenticate himself or herself. Alternatively, the vehicle 470-3 and/or the occupant 472-3 may have arrived at the parking facility 440 for the first time, or by accident, and the worker 450-3 may invite the occupant 472-3 or the vehicle 470-3 to register with a retail establishment associated with the parking facility 440, associate either or both of the occupant 472-3 or the vehicle 470-3 with a customer identifier, and take an order for one or more items directly from the occupant 472-3. The number and type of ways in which the worker 450-3 may identify or authenticate the vehicle 470-3 or the occupant 472-3 are not limited.

Figure 4G:
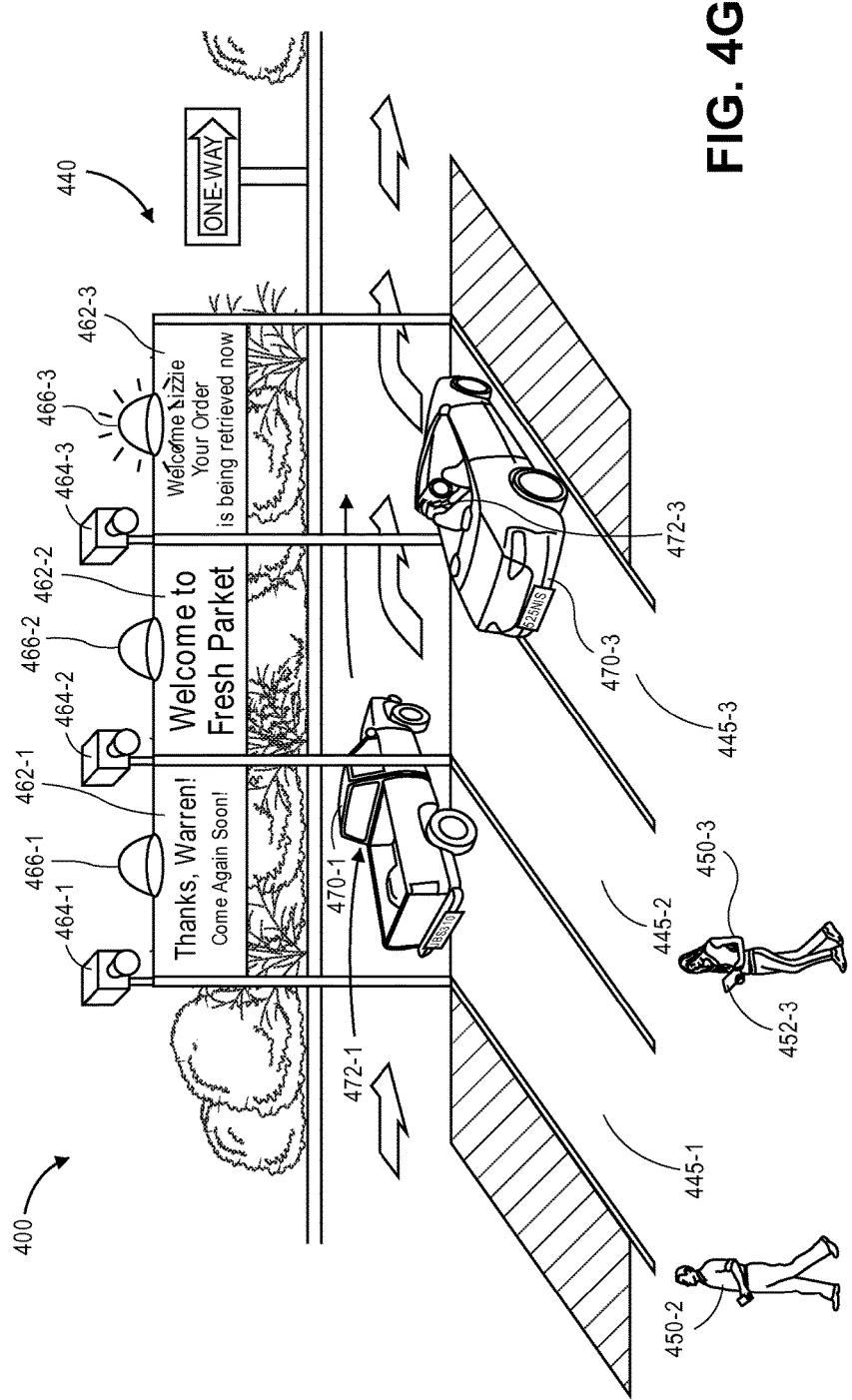

Referring to FIG. 4G, the vehicle 470-3 is shown in the parking location 445-3, and the vehicle 470-1 is shown as departing the parking location 445-1, while the parking location 445-2 remains vacant. The worker 450-2 is shown as departing from the parking location 445-1, e.g., returning to one or more of the kiosks 430-1, 430-2, 430-3, after having delivered the items 40-2 to the vehicle 470-1. The worker 450-3 is also shown as departing from the parking location 445-3 with the handheld device 452-3, e.g., after having identified or authenticated the vehicle 470-3 or the occupant 472-3 thereof, and may also return to one or more of the kiosks 430-1, 430-2, 430-3 to retrieve any items ordered by the occupant 472-3 or otherwise associated with the vehicle 470-3, or items that may be associated with another vehicle that may arrive at a later time. The computer display 462-1 includes a departure message to the occupant 472-1 of the vehicle 470-1. The computer display 462-2 indicates that the parking location 445-2 is vacant and able to accommodate another vehicle (not shown), while the computer display 462-3 indicates the status of an order that was placed with the retail establishment by the occupant 472-3 or is otherwise associated with the vehicle 470-3. The indicators 466-1, 466-2 are not lit, while the indicator 466-3 is lit.

As is discussed above, in some embodiments of the present disclosure, the delivery of ordered items to a vehicle in a parking location (e.g., a parking space at a parking facility) may be triggered by the arrival of the vehicle at the parking location, the automatic recognition and identification of the vehicle, and the automatic association of the vehicle or one or more occupants thereof with the one or more ordered items (e.g., by identifying a customer identifier associated with the vehicle or one or more occupants thereof, and by subsequently identifying an order for one or more items associated with the customer identifier). Alternatively, in some other embodiments of the present disclosure, the delivery of the items may be triggered by an authentication of the vehicle or one or more of the occupants thereof by manual or automatic means, and the association of the vehicle or one or more occupants thereof with the order for the one or more items. In still other embodiments, e.g., where a vehicle or occupants thereof are not automatically identified, and where the occupants thereof do not otherwise authenticate or identify themselves, one or more workers may attend to the vehicle and provide assistance to the occupants, and identify the vehicle or the occupants by manual or automatic means. If the vehicle or the occupants is associated with an order for one or more items, the attending workers may then authenticate the vehicle or the occupants, and trigger the delivery of the items thereby.

Figure 5:
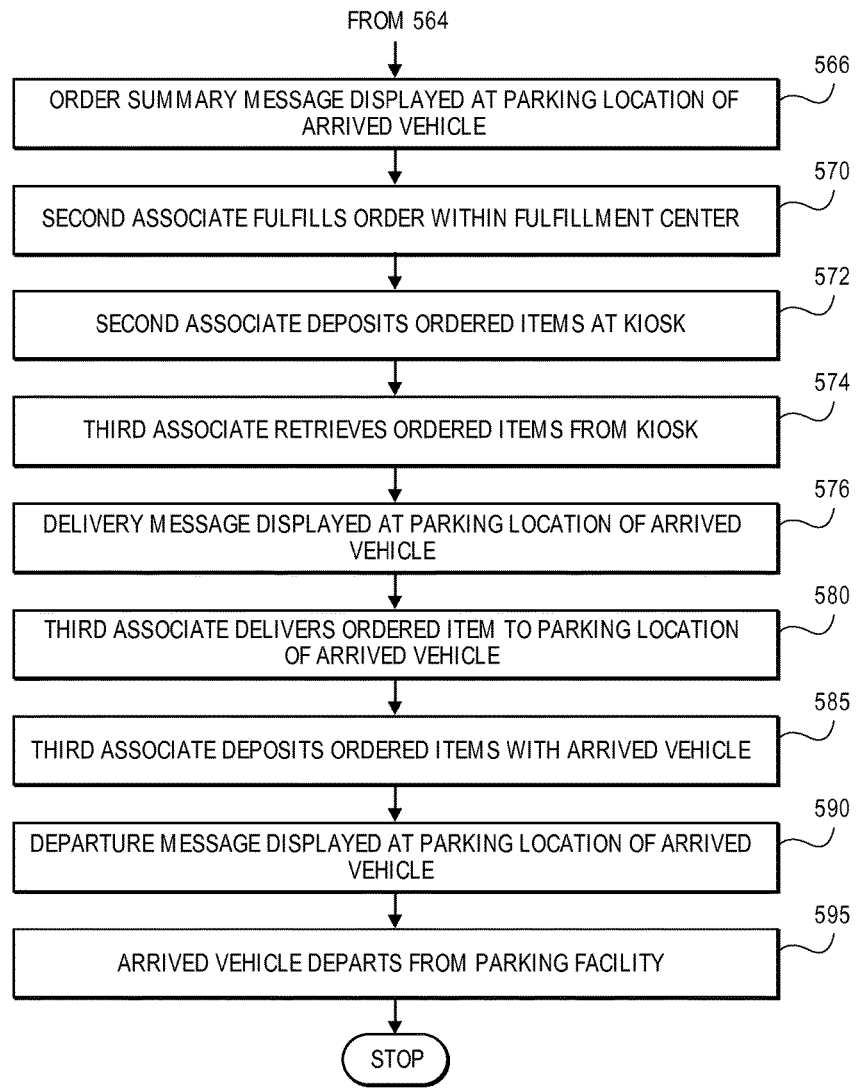
FIG. 5 is a flow chart of one process for fulfilling an order in an interactive parking facility in accordance with embodiments of the present disclosure.

Referring to FIG. 5, a flow chart 500 representing one process for fulfilling an order in an interactive parking facility in accordance with embodiments of the present disclosure is shown. At box 510, one or more introductory messages, e.g., the messages shown on the computer displays 462-1, 462-2, 462-3 as shown in FIG. 4A, are displayed at parking locations within a parking facility. At box 515, one or more sensors continuously monitor the parking locations for arriving vehicles. For example, one or more imaging devices or other sensors, e.g., the sensors 164-1, 164-2, 164-3, 164-4 of FIG. 1A, or the sensors 464-1, 464-2, 464-3 of FIGS. 4A through 4C or FIGS. 4E through 4G, may be aligned and configured to determine whether any objects appear within a field of view of such devices or sensors, e.g., based on whether any such objects appear within pixel values of imaging data captured thereby. At box 520, if no vehicles are sensed in a given parking location, then the process returns to box 515, where the parking locations of the parking facility remain subject to continuous monitoring.

If a vehicle is sensed in a parking location, however, then the process advances to box 525, where the vehicle is evaluated within the parking location using the one or more sensors. Where the sensors include a digital camera, imaging data captured by the digital camera may be evaluated to recognize a license plate, a marking or another identifier on the vehicle, or to identify one or more other attributes of the vehicle including but not limited to a make, a model, a year, a color or a size of the vehicle. Alternatively, such imaging data may be processed according to one or more facial recognition processes or techniques in an effort to identify an occupant of the vehicle. Where the sensors include a depth sensor or range camera, the various aspects of a depth profile of the parking location captured prior to the arrival of the vehicle, and a depth profile of the parking location captured following the arrival of the vehicle, may be compared to one another in order to determine a net profile of the vehicle. Where the sensors include one or more scales or other contact sensors, a mass of the vehicle may be determined. Where the sensors include one or more microphones or other audio sensors, an acoustic signature of the vehicle (e.g., broadband noise or narrowband tonals emitted by the vehicle during operation) may be determined. Any type or information or data that may be gathered from the vehicle within the parking location may be evaluated for any purpose in accordance with the present disclosure.

At box 530, whether the vehicle is identified using the sensors may be determined. If the vehicle cannot be identified based on the information or data gathered by such sensors, then the process advances to box 535, where a prompt message requesting authentication according to a predetermined procedure is displayed on a computer display provided at the parking location of the arrived vehicle. For example, instructions to authenticate the vehicle and/or an occupant thereof by logging into a predetermined website, by activating one or more features on a user interface of an application operating on a handheld device, by transmitting an electronic message (e.g., an SMS or MMS text message) to a predetermined telephone number or electronic account, or by executing a predetermined gesture within a field of view of an imaging device (e.g., a wave of a hand or arm) may be provided on one or more of the computer displays 462-1, 462-2, 462-3 of FIGS. 4A through 4C or FIGS. 4E through 4G, when a vehicle that may not be identified by one or more sensors is present within one or more of the parking locations 445-1, 445-2, 445-3. Alternatively, instructions to authenticate the vehicle and/or an occupant thereof by calling or sending a text message (e.g., an SMS message or an MMS message) to a predetermined telephone number may be provided.

At box 540, if the vehicle is not authenticated according to the predetermined procedure in accordance with the prompt message, the process advances to box 550, where a first associate (e.g., a worker supervising or otherwise dispatched to the parking facility) is instructed to attend to the parking location of the arrived vehicle, and to box 552, where the first associate attends to the arrived vehicle. At box 554, whether the first associate is able to identify the arrived vehicle is determined. For example, the first associate may ask an occupant of the vehicle to identify himself or herself, e.g., by providing his or her name, a user name and/or password, a customer identifier, or an order number. If the first associate is unable to identify the arrived vehicle, then the process advances to box 556, where a promotional message is displayed at the parking location of the arrived vehicle, e.g., on one or more of the computer displays 462-1, 462-2, 462-3 at the parking locations 445-1, 445-2, 445-3, and the process ends.

If the vehicle is identified either using information obtained from the one or more sensors, according to the predetermined procedure at box 540, or by the first associate at the parking location of the arrived vehicle at box 554, then the process advances to box 545, where a confirmation message is displayed at the parking location of the arrived vehicle. For example, the confirmation message may include a name of an occupant of the vehicle, or an individual associated with a customer identifier linked to the vehicle, along with a greeting or other pleasantry. At box 560, information identifying the arrived vehicle is transmitted to a fulfillment center associated with the parking facility, e.g., the fulfillment center 120 adjacent to the parking facility 140 of FIG. 1A, and at box 562, an order associated with the arrived vehicle is identified by the fulfillment center.

At box 564, information regarding the order associated with the arrived vehicle is received at the parking location of the arrived vehicle, e.g., by one or more computing devices associated with the parking location, and at box 566, an order summary message is displayed at the parking location of the arrived vehicle. For example, referring again to FIGS. 4B, 4C and 4E through 4G, the messages displayed on the computer displays 462-2, 462-3 indicate the statuses of orders placed by the occupants 472-2, 472-3 of the vehicles 470-2, 470-3. Some order summary messages may identify or include an image of a worker who will be delivering the ordered items to the vehicle, and may include related information such as an estimated time of arrival of the ordered items. Alternatively, some order summary messages may include tangentially related information such as preparation instructions for food, assembly instructions for toys, appliances or machines, or advertisements for items that are related to (e.g., either substitutable or complementary for) one or more of the items included in the respective orders, or any other type of information.

At box 570, a second associate fulfills the order within the fulfillment center, and at box 572, the second associate deposits the ordered items at a kiosk or other staging area. For example, upon identifying the information regarding the order associated with the arrived vehicle at box 564, one or more instructions to retrieve, prepare and/or gather the items included in the order may be provided to an associate within the fulfillment center by any means (e.g., electronic messaging, visual displays or audible signals). The second associate may be selected to fulfill the order at random, based on his or her prior experience in fulfilling similar orders placed by the occupant of the vehicle or others, or on any other basis. Moreover, the arrival of the ordered items at the kiosk may be determined or confirmed by any means or on any basis, including but not limited to one or more imaging devices or scanners provided at the kiosk that may be configured to recognize bar codes, price look-up (or "PLU") numbers, stock keeping unit (or "SKU") numbers or the like affixed to the items.

At box 574, a third associate retrieves the ordered items from the kiosk, and at box 576, a delivery message is displayed at the parking location of the arrived vehicle. The arrival and subsequent departure of the third associate at the kiosk may be registered by any means, e.g., a manual entry of information onto a keypad or other interface by the third associate, an automatic reading of a bar code provided on a badge or other identification of the third associate, or an automatic interpretation of a signal emitted by an RFID tag, a key fob or a like device associated with the third associate. Upon confirming that the third associate has retrieved the ordered items, one or more messages or other indicators may be displayed at the parking location of the arrived vehicle, including but not limited to an identification and/or image of the third associate, or an estimated time by which the worker is expected to arrive there. Alternatively, an active message to the third associate may be displayed on a computer display at the parking location of the arrived vehicle, e.g., on one of the computer displays 462-1, 462-2, 462-3 of FIGS. 4A through 4C and 4E through 4G, or a passive message to the third associate may be provided by other means, e.g., an illumination of one or more of the indicators 462-1, 462-2, 462-3, in order to enable the third associate to identify the arrived vehicle.

At box 580, the third associate delivers the ordered items to the parking location of the arrived vehicle, and at box 585, the third associate deposits the ordered items with the arrived vehicle. For example, in some implementations, the third associate may introduce himself or herself to an occupant of the vehicle upon his or her arrival, and ask the occupant where he or she would like the third associate to place the items (e.g., in a trunk or on the floor of a back seat). In some other implementations, the third associate need not communicate with the occupant of the vehicle or any passengers therein at all. For example, as the third associate approaches the vehicle, a message prompting the occupant of the vehicle to identify and enable access to the portion of the vehicle where the occupant would like the third associate to deposit the ordered items (e.g., "pop the trunk!") may be displayed to the occupant. Alternatively, the third associate may manually or automatically open one or more access points to the vehicle (e.g., a door or a trunk) and place the items inside without further communication with the occupant of the vehicle.

At box 590, a departure message is displayed at the parking location of the arrived vehicle. The departure message may confirm that the items have been deposited at the arrived vehicle, and may further thank the occupant of the vehicle for ordering the items, or offer one or more digital coupons or other redemption opportunities for the occupant. Moreover, the departure message may also inform occupants of other vehicles that the parking location may be expected to become available shortly. At box 595, the arrived vehicle departs from the parking facility, and the process ends. Subsequently, the third associate may return to one or more of the kiosks or staging areas and await further instructions, or perambulate through the parking facility in search of vehicles and/or occupants thereof who may require assistance, and another vehicle may be free to enter the parking location that was previously occupied by the arrived vehicle.

Figure 6A:
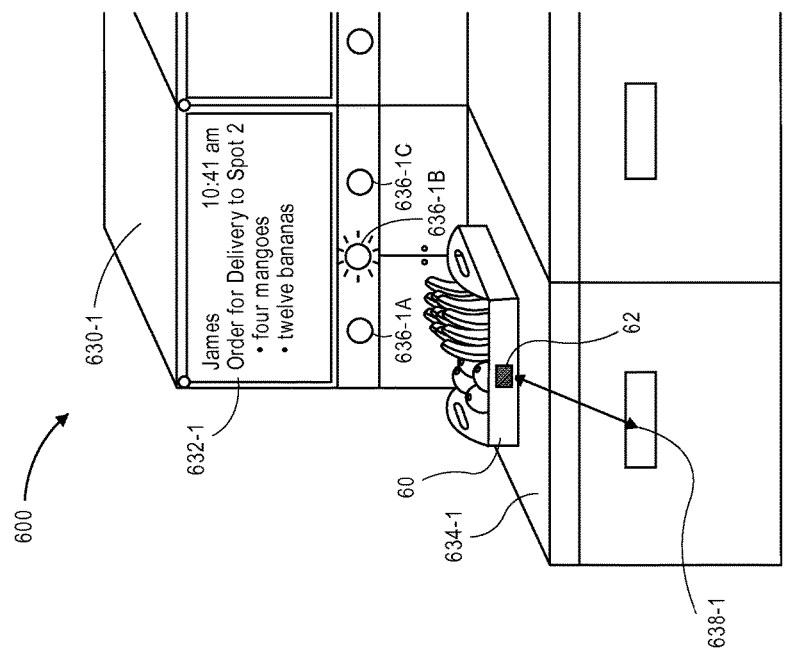
Figure 6A:
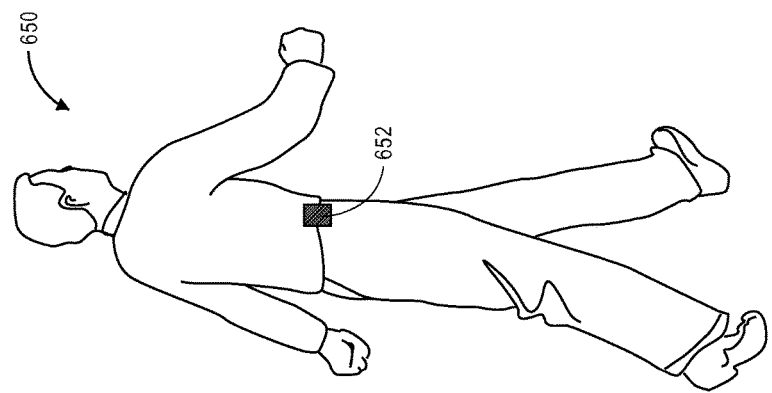
Figure 6B:
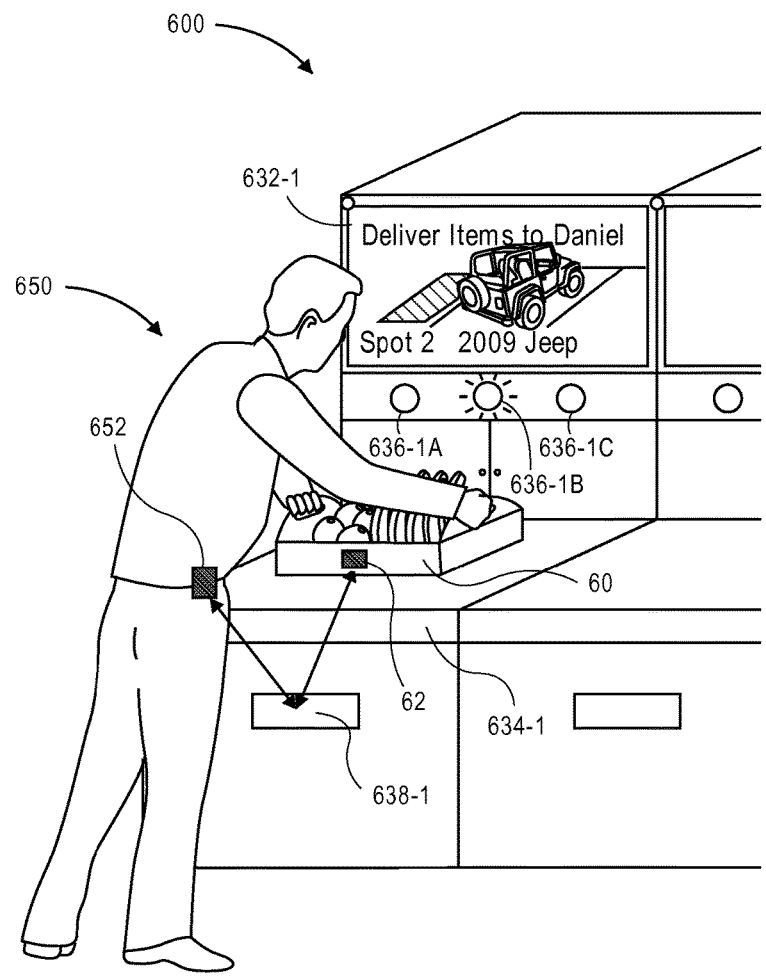

As is also discussed above, vehicles, items and/or workers may be recognized at various locations within an interactive parking facility using any number or type of sensors, readers or other devices in accordance with the present disclosure. Moreover, the display of information on one or more computer displays may be predicated upon, or driven by, the acknowledgment of one or more vehicles, items or workers at such locations. Referring to FIGS. 6A through 6C, a system 600 including an interactive parking facility 640 in accordance with embodiments of the present disclosure is shown. Except where otherwise noted, reference numerals preceded by the number "6" shown in FIGS. 6A through 6C indicate components or features that are similar to components or features having reference numerals preceded by the number "4" shown in FIGS. 4A through 4G, by the number "2" shown in FIGS. 2A through 2C, or by the number "1" shown in FIGS. 1A through 1C.

The system 600 includes a kiosk 630-1, the parking facility 640 and a worker 650. As is shown in FIG. 6A, a bin 60 including a plurality of items therein has been deposited at the kiosk 630-1. The bin 60 includes an RFID tag (or other RFID transmitting device) 62 provided thereon. The kiosk 630-1 further includes a computer display 632-1, a sensor 634-1 (e.g., a scale or like sensing component), a plurality of indicators 636-1A, 636-1B, 636-1C and an RFID reader 638-1. The parking facility 640 includes a plurality of parking locations 645-1, 645-2, 645-3 and a sensor 664, with a vehicle 670 operated by an occupant 672 parked in the parking location 645-2. Each of the parking locations 645-1, 645-2, 645-3 further includes a computer display 662-1, 662-2, 662-3, an indicator light 666-1, 666-2, 666-3 and an RFID reader 668-1, 668-2, 668-3. The sensor 664 (e.g., a digital camera or other imaging device) is aligned to capture information regarding activity occurring within the parking facility 640 in general, and within the parking locations 645-1, 645-2, 645-3 in particular.

As is also shown in FIG. 6A, the worker 650 approaches the kiosk 630-1 to retrieve the bin 60 while also wearing an RFID tag (or other RFID transmitting device) 652 about his waist. Prior to the arrival of the worker 650 at the kiosk 630-1, the computer display 632-1 displays a name of the worker 650 (viz., James), a current time, information regarding the contents of the bin 60 (viz., four mangoes and twelve bananas) and an identifier of the location (viz., "Spot 2") to which the bin 60 should be delivered. The computer display 632-1 may also include or display any other information regarding the bin 60, the vehicle 670 or the occupant 672, including a time at which the vehicle 670 arrived, an elapsed time or a duration for which the vehicle 670 has been location within a particular parking space, or a purchase history, a browsing history or any other preferences that may be identified regarding a customer identifier associated with the vehicle 670 or the occupant 672. Additionally, the only RFID signals received by the RFID reader 638-1 include those transmitted by the RFID tag 62 on the bin 60.

Referring to FIG. 6B, when the worker 650 arrives at the kiosk 630-1, a confluence of RFID signals is received by the RFID reader 638-1 from both the RFID tag 652 worn by the worker 650 and the RFID tag 62 provided on the bin 60. Upon receiving the confluence of RFID signals at the RFID reader 638-1, the worker 650 is recognized as having arrived at the kiosk 630-1, and information regarding the delivery of the items in the bin 60 is displayed on the computer display 632-1. For example, as is shown in FIG. 6B, the computer display 632-1 includes an instruction to the worker 650 (viz., "Deliver Items to Daniel"), as well as an image of the vehicle 670 to which the bin 60 should be delivered, a location of the vehicle 670, and one or more attributes of the vehicle 670 (e.g., a year, make and/or model of the vehicle 670).

Referring to FIG. 6C, the parking facility 640 is shown following the departure of the worker 650 and the bin 60 from the kiosk 630-1, and the arrival of the worker 650 and the bin 60 at the parking location 645-2. A confluence of RFID signals is received at the RFID reader 668-2 associated with the parking location 645-2, including signals transmitted from both the RFID tag 652 worn by the worker 650 and the RFID tag 62 provided on the bin 60. Upon receiving the confluence of signals at the RFID reader 668-2, the worker 650 and the bin 60 are recognized as having arrived at the parking location 645-2, and information regarding the delivery of the items in the bin 60 is displayed on the computer display 626-2, in view of the occupant 672. Specifically, the computer display 626-2 identifies the worker 650 and indicates that the worker 650 has arrived. Alternatively, the computer display 626-2 may provide further information regarding the delivery of the ordered items, including a total price of the items and any taxes, fees or other charges, operating instructions (e.g., recipes) for properly utilizing the items after the occupant 672 and/or the vehicle 670 return to their destinations, or advertisements for one or more substitutable or complementary items.

Those of ordinary skill in the pertinent art will recognize that a departure of the worker 650 from the parking location 645-2 will result in the signal transmitted from the RFID tag 652 being no longer received at the RFID reader 668-2 (e.g., when the worker 650 travels beyond an operational range of the RFID reader 668-2). When the signal transmitted from the RFID tag 652 is no longer received at the RFID reader 668-2, and the signal transmitted from the RFID tag 62 is received at the RFID reader 668-2, the departure of the worker 650 from the parking location 645-2 may be confirmed, and an indication that the worker 650 has delivered the bin 60 and/or one or more items to the vehicle 670-2 may be stored in at least one data store.

As is further discussed above, information regarding the retrieval and preparation of items at a fulfillment center for delivery to a vehicle in an interactive parking facility may be displayed to a worker on one or more computer displays at a kiosk or other staging area, based on an automatic determination of a status of the items, or an automatic recognition that the worker and/or the ordered items are at a common location. By prominently displaying such information at the kiosk or other staging area, the fulfillment of orders and the delivery of ordered items to a vehicle is further facilitated. Referring to FIG. 7, a flow chart 700 representing one process for fulfilling an order in an interactive parking facility in accordance with embodiments of the present disclosure is shown. At box 710, introductory messages are displayed at kiosks at a fulfillment center. Such messages may indicate that the kiosk is occupied or currently unavailable to receive any bins, totes or other carrying devices including such items, or not occupied and currently available to receive one or more of such bins, totes or other carrying devices. At box 720, information regarding an arrival of a vehicle associated with a previously placed order is received from a parking location. For example, referring again to FIG. 4A, the arrival of the vehicle 470-2 at the parking location 445-2 may be recognized and recorded using one or more sensors, e.g., the sensor 464-2, and information or data captured using such sensors may be provided to a kiosk or one or more servers or computing devices operated by a fulfillment center associated with the kiosks, such as one or more of the kiosks 430-1, 430-2, 430-3 shown in FIG. 4D.

At box 722, the previously placed order associated with the arrived vehicle is identified, and at box 724, an available kiosk is also identified. The previously placed order may be identified based on at least some of the information regarding the vehicle and/or an occupant thereof received at box 720, which may be used to identify a customer identifier associated with either the vehicle or the occupant thereof, and the previously placed order may be identified as associated with the customer identifier. Likewise, the available kiosk may be identified based not only on sensor outputs or other information or data but also any physical or virtual constraints associated with the kiosks (e.g., dimensions, capacities or previously scheduled activities) with respect to the items included in the previously placed order.

At box 730 a first worker within the fulfillment center is tasked with retrieving the items included in the order and delivering such items to the available kiosk identified at box 724. The first worker may be a picker or like associate trained to locate, retrieve and transport one or more of the items included in the order to one or more specific locations, such as the available kiosk or another staging area. At box 732, the first worker deposits the ordered items at the available kiosk identified at box 724, and at box 734, the arrival of the first worker with the ordered items is registered at the available kiosk. For example, referring again to FIG. 6B, a bin, a tote or another carrying device, such as the bin 60, which includes the ordered items, or the ordered items themselves, may be adorned with one or more RFID devices or other transmitting components (e.g., the RFID tag 62) that are configured to transmit one or more signals to a nearby reader. The first worker may also bear or wear an identifying badge or like device which also includes one or more RFID devices or other transmitting components (e.g., the RFID tag 652).

The arrival of the ordered items at the available kiosk may thus be acknowledged and/or registered where an RFID signal is received from an RFID device provided on the carrying device or one or more of the items, or from an RFID device associated with the first worker or a worker profile of the first worker, or when a confluence of RFID signals is received from both the RFID device provided on the carrying device or on one or more of the items and the RFID device associated with the first worker. Additionally, the first worker may carry the ordered items out of the fulfillment center and to the available kiosk or another staging area or, alternatively, transfer the ordered items out of the fulfillment center by way of a door, a window or another portal connecting an interior of the fulfillment center with the available kiosk.

At box 740, a second worker located outside of the fulfillment center is instructed to report to the available kiosk identified at box 724. The second worker may receive one or more electronic messages, e.g., to a handheld device maintained or operated by the second worker or associated with a worker profile of the second worker, or in any other manner, such as by displaying information regarding the ordered items and identifying the second worker on one or more computer displays located outside of the fulfillment center, e.g., the computer display 632-1 shown in FIGS. 6A and 6B.

At box 742, an order message identifying the second worker and the order is displayed at the available kiosk identified at box 724. The order message may include information regarding the contents of the order, e.g., one or more of the individual ordered items, or any other relevant information. At box 744, the second worker arrives at the available kiosk identified at box 724 to retrieve the ordered items, and at box 746, the arrival of the second worker at the available kiosk is registered. For example, as is discussed above, an arrival of the second worker at the available kiosk may be detected and/or acknowledged based on a single RFID signal received from an RFID tag associated with the second worker, or a confluence of multiple RFID signals received from RFID tags associated with the worker and/or the ordered items, or any other objects, entities or individuals, such as is shown in FIG. 6B.

At box 750, a delivery message identifying a parking location in which the vehicle associated with the order is located is displayed at the available kiosk identified at box 724. For example, after registering the arrival of the second worker, the computer display may be modified to remove the order message displayed at box 742, and to display information regarding the order, including an identification of a customer who placed the order, a vehicle associated with the order or an occupant thereof, or a location of the vehicle associated with the order, to the second worker on the computer display. At box 755, a vehicle identification message may be displayed at the parking location of the vehicle associated with the order. Separately or concurrently with the display of the delivery message at the available kiosk, the vehicle identification message may be displayed at the parking location, thereby enabling the second worker to easily recognize the vehicle associated with the order without having to divert his or her attention to an electronic or paper map, or other source of information. The vehicle identification message may be displayed on a computer display or, alternatively, by a passive indication system such as one or more of the indicators 666-1, 666-2, 666-3 associated with the parking locations 645-1, 645-2, 646-3, as is shown in FIG. 6C.

At box 760, the second worker departs from the available kiosk identified at box 724 with the ordered items for the parking location of the recently arrived vehicle, and at box 765, the departure of the second worker is registered at the available kiosk. The departure of the second worker and/or the ordered items may be registered by any means or method in accordance with the present disclosure. For example, just as the arrival of the second worker bearing an RFID tag and/or the ordered items in a bin also bearing an RFID tag may be registered based on RFID signals, or a confluence of RFID signals, received from the RFID tags, the departure of the second worker and/or the ordered items may be registered or otherwise confirmed when a previously observed RFID signal or confluence of RFID signals is no longer observed, e.g., when the second worker and/or a bin including such ordered items move outside of a range of an RFID reader that previously observed such signals.

Finally, at box 770, with the departure of the second worker and the ordered items from the available kiosk identified at box 724, the introductory message is displayed at the available kiosk, and the process ends. The introductory message displayed at box 770 may be the same introductory message displayed on one or more of the kiosks at box 710 or, alternatively, may be a different message that otherwise indicates that the kiosk is once again available.

Accordingly, one or more embodiments of the present disclosure may increase the efficiency by which orders are fulfilled and delivered to customers waiting in predetermined locations (e.g., parking spaces or parking spots) within a parking facility by automatically recognizing the arrival of a vehicle at the parking facility, identifying the vehicle by one or more manual or automatic means, identifying an order associated with the vehicle, and retrieving one or more items included in the order from within a fulfillment center. Subsequently, the ordered items may be deposited at a kiosk or other staging area for delivery to the vehicle. The ordered items are fulfilled and delivered by workers based on information displayed on one or more interactive displays throughout the parking facility, including displays associated with the kiosk or other staging area, or with one or more of the parking locations at the parking facility. The information to be displayed on such displays may be selected and shown based on detected interactions between vehicles, items and workers, in order to enable a worker to deliver the ordered items to a vehicle without requiring any further action on his or her part, other than to follow instructions displayed on such displays and to identify the vehicle accordingly.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein include fixed numbers of parking locations (e.g., parking spaces or parking spots), or fixed ratios of the numbers of parking locations to the numbers of kiosks or other staging areas, those of ordinary skill in the pertinent arts will recognize that the systems and methods of the present disclosure may be utilized in connection with any type of parking facility having any number of parking locations that are configured to accommodate any type, size or number of vehicles. Moreover, the systems and methods disclosed herein are not limited for use in connection with standard-sized, general purpose parking locations, and may also be utilized in connection with handicapped spaces, reserved spaces, loading zones or other limited access parking locations, or locations that may, but need not, be designated or reserved for parking or storing one or more vehicles therein. Furthermore, the features of the interactive parking facilities disclosed herein need not be limited for use in connection with parking facilities adjacent to fulfillment centers or other like facilities, for which a customer's single purpose is to arrive and retrieve his or her items without departing a vehicle. Instead, some of the embodiments disclosed herein may be utilized in connection with general-purpose parking facilities associated with multiple establishments.

Additionally, although some of the embodiments disclosed herein reference the delivery of items to vehicles that are parked, e.g., stopped or otherwise motionless, within a facility, those of ordinary skill in the pertinent arts will further recognize that the systems and methods disclosed herein may be used in connection with vehicles that are moving. For example, when a vehicle arrives at a facility, a location and velocity of the vehicle may be determined, and one or more instructions for delivering an item to the vehicle may be presented to a worker on one or more computer displays. One of the instructions may inform the worker of the velocity of the vehicle, and the worker may deliver the item to the moving vehicle by at least temporarily matching the velocity of the vehicle and depositing the item therein.

Moreover, those of ordinary skill in the pertinent arts will further recognize that vehicles may be detected and/or identified according to a number of systems and methods, and need not be limited to identification based on imaging data captured from one or more license plates. For example, a fulfillment center and/or parking facility may issue a predetermined marker or identifier associated with a customer or customer identifier (e.g., a window decal or bumper sticker) that is to be affixed to a portion of a vehicle and the arrival of the vehicle may be recognized when the marker or identifier is detected by one or more sensors or readers, such as an imaging device or bar code scanner. The fulfillment center and/or parking facility may also issue a preprogrammed RFID tag to a customer for use in connection with a vehicle. When the vehicle arrives at the parking facility, the RFIG tag may transmit an identifying RFID signal to one or more RFID readers provided at the parking facility, and the customer, the vehicle and/or an occupant of the vehicle may be identified thereby. The RFID signal may include a customer identifier associated with the customer, the vehicle and/or the occupant, or may otherwise identify the customer, the vehicle and/or the occupant in any way.

Furthermore, those of ordinary skill in the pertinent arts will further recognize that actions described herein as being performed by one or more human workers (e.g., associates) may also be performed by one or more one or more machines (e.g., autonomous mobile robots). For example, those of ordinary skill in the pertinent arts will recognize that one or more of such robots may retrieve the various items included in an order, deliver such items to a kiosk or other staging area, retrieve such items at the kiosk, and deliver such items to a vehicle in one or more parking locations at a parking facility. An autonomous mobile robot performing such tasks may include one or more sensors (e.g., imaging devices or microphones) that enable the autonomous mobile robot to recognize and respond to instructions or signals ordinarily intended for human workers, including but not limited to visual instructions provided on a computer display, which may be read and interpreted using one or more digital cameras or other imaging devices, as well as audible instructions emitted from a speaker or other audio device, which may be captured and interpreted using one or more microphones. Moreover, some embodiments of the present disclosure may transmit instructions to one or more autonomous mobile robots that may be only recognized and responded to by such robots, and may not be recognized by human workers.

Those of ordinary skill in the pertinent arts will also recognize that the systems and methods disclosed herein do not require the use of vehicles, and can be utilized equally well in environments where no vehicles are present. For example, some implementations of the present disclosure may include systems or methods that are configured to recognize and identify a user entering a materials handling facility such as a fulfillment center, a retail establishment or another like facility (e.g., on foot). The user may be recognized and identified according to any of the systems or methods disclosed herein, e.g., by receiving and interpreting an RFID signal received from an RFID tag associated with the user, by evaluating imaging data regarding the user to identify the user based on his or her physical features or appearance, such as his or her face, clothing or another wearable identifier, or by capturing audio signals (e.g., spoken words or sounds) emitted by the user, using one or more microphones. Once a user has been recognized, one or more items associated with the user may be delivered to the user by a human worker, an autonomous mobile robot, or in accordance with any of the systems and methods in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an application-specific integrated circuit, or ASIC, which can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system for distributing items comprising:
   a fulfillment center building;
   a parking facility having at least a first parking space;
   a first digital camera associated with the first parking space; and
   a computing device in communication with at least the first digital camera, wherein the computing device is configured to at least:
   receive, over a network, first information regarding an order comprising at least one item, wherein the order is placed by a customer associated with a customer identifier;
   cause a display of second information regarding the at least one item or the order on a display of a first mobile device associated with a first worker, wherein the second information comprises:
       an identifier of the at least one item or the order,
       a location of the at least one item within the fulfillment center building, and
       an instruction to retrieve the at least one item from the location and deliver the at least one item to a staging area within the fulfillment center building;
   cause the first digital camera to capture a first digital image including a first set of pixel values representing the first parking space;
   analyze the first set of pixel values;
   determine that a first vehicle is in the first parking space;
   identify a second set of pixel values of the first digital image corresponding to a license plate mounted to the first vehicle;
   recognize a license plate identifier in the second set of pixel values of the first digital image;
   determine that the first vehicle is associated with the customer identifier based at least in part on a record maintained in a data store, wherein the first vehicle being associated with the customer identifier is determined using the license plate identifier;
   in response to determining that the first vehicle in the first parking space is associated with the customer identifier:
       determine a position of a second mobile device associated with a second worker;

determine, based at least in part on the position of the second mobile device, that the second worker is within a vicinity of the staging area;

cause a display of third information on a display of the second mobile device, wherein the third information comprises:
  the identifier of the at least one item or the order,
  an identifier of at least one of the first vehicle, the first parking space, the customer associated with the customer identifier, or an occupant of the first vehicle, and
  an instruction to deliver the at least one item or the order to one of the first parking space or the first vehicle; and cause a display of fourth information on a display of a third mobile device associated with at least one of the customer, the occupant, the first vehicle, or the customer identifier, wherein the fourth information comprises at least one of:
  a name of the second worker,
  an image of the second worker, or
  an estimated time of arrival of the second worker, the at least one item, or the order at the first parking space or the first vehicle.

2. The system of claim 1, wherein the computing device is further configured to at least:
recognize at least an outline within the first set of pixel values representing the first parking space; and
determine that the outline corresponds to the first vehicle.

3. The system of claim 1, wherein the computing device is further configured to at least:
identify the customer associated with the customer identifier; and
determine the order placed by the customer.

4. The system of claim 1, wherein the parking facility has a second parking space,
wherein the system further comprises a second digital camera associated with the second parking space,
wherein the computing device is in communication with the second digital camera, and
wherein the computing device is further configured to at least:
  cause the second digital camera to capture a second digital image including a third set of pixel values representing the second parking space;
  analyze the third set of pixel values;
  determine that a second vehicle is in the second parking space;
  identify a fourth set of pixel values of the second digital image corresponding to a license plate mounted to the second vehicle; and
  determine that a second license plate identifier is not recognized in the fourth set of pixel values of the second digital image.

5. A computer-implemented method comprising:
receiving, over a network, first information regarding an order comprising at least one item, wherein the order is placed by a customer associated with a customer identifier;
causing a display of second information regarding the at least one item or the order on a first mobile device of a first worker at a building, wherein the second information comprises:
  an identifier of the at least one item or the order;
  at least a first location of the at least one item within the building; and
  an instruction to retrieve the at least one item from within the building and deliver the at least one item to a staging area associated with at least one of the building or a facility associated with the building;
capturing first imaging data including a first set of pixel values representing a second location of the facility by at least one sensor, wherein the second location comprises a parking location for accommodating at least one vehicle, and wherein the at least one sensor comprises a first digital camera having at least the second location within a first field of view;
identifying a first vehicle in the second location based at least in part on the first imaging data using at least one computer processor;
determining, using the at least one computer processor, that the first vehicle is associated with the customer identifier based at least in part on a record maintained in a data store;
in response to determining that the first vehicle in the second location is associated with the customer identifier:
  determining, using the at least one computer processor, a position of a second mobile device associated with a second worker;
  determining, using the at least one computer processor, that the second worker is within a vicinity of the staging area based at least in part on the position of the second mobile device;
  causing a display of third information regarding the at least one item or the order on the second mobile device, wherein the third information comprises:
    an identifier of one or more of the at least one item or the order;
    an identifier of at least one of the first vehicle, the second location, the customer associated with the customer identifier, or an occupant of the first vehicle; and
    an instruction to transport the at least one item from the staging area to the first vehicle; and
  causing a display of fourth information on a third mobile device associated with the customer identifier, wherein the fourth information comprises:
    an identifier of the second worker, wherein the identifier of the second worker comprises at least one of a name of the second worker or an image of the second worker;
    an identifier of one or more of the at least one item or the order; and
    an estimated time of arrival of the second worker or the at least one item at the first vehicle.

6. The computer-implemented method of claim 5, further comprising:
determining, using the at least one computer processor, that at least one item is in the staging area;
in response to determining that the at least one item is in the staging area, causing, using the at least one computer processor, a display of fifth information on a sign associated with the staging area, wherein the fifth information comprises an instruction to transport the at least one item from the staging area to the first vehicle,
wherein the third information is caused to be displayed on the second mobile device in response to determining that the at least one item is in the staging area.

7. The computer-implemented method of claim 6, wherein the fifth information further comprises:

a name of at least one of the first vehicle, the occupant of the first vehicle, or the customer associated with the customer identifier;

a description of at least one of the first vehicle, the customer, or the occupant;

an image of at least one of the first vehicle, the customer, or the occupant;

a geographic identifier of the second location; or the identifier of the at least one item or the order.

8. The computer-implemented method of claim 5, wherein the at least one sensor further comprises an RFID reader, and wherein determining that the customer identifier is associated with the first vehicle further comprises:

receiving at least one RFID signal by the RFID reader;

determining, using the at least one computer processor, that the at least one RFID signal corresponds to an RFID tag associated with the first vehicle; and determining that the customer identifier is associated with the first vehicle based at least in part on the at least one RFID signal.

9. The computer-implemented method of claim 5, further comprising:

capturing second imaging data regarding a third location of the facility, by the at least one sensor, wherein the at least one sensor further comprises a second digital camera having at least the third location within a second field of view;

determining that a second vehicle is in the third location based at least in part on the second imaging data;

determining that the second vehicle may not be identified based on the second imaging data; and causing a display of fifth information on a sign associated with at least one of the facility or the building using the at least one computer processor, wherein the fifth information comprises an instruction to attend to the second vehicle in the third location.

10. The computer-implemented method of claim 5, wherein the facility is at least one of a parking lot, a parking garage, or an on-street parking facility, and wherein the first vehicle is at least one of a car, a truck, a van, a motorcycle, or a bicycle.

11. The computer-implemented method of claim 5, further comprising:

prior to causing the display of the second information on the first mobile device of the first worker, instructing an autonomous mobile robot to transport the at least one item from a third location within the building to the first location.

12. A system comprising:

a distribution facility building;

a parking location associated with the distribution facility building;

a first sensor associated with the distribution facility building, wherein the first sensor comprises a first imaging device having at least a portion of the parking location within a first field of view; and at least one server in communication with at least the first sensor; wherein the at least one server is configured to at least:

receive first information regarding an order comprising at least one item, wherein the order is placed by a customer associated with a customer identifier;

cause a display of second information regarding the at least one item or the order on a first mobile device associated with a first worker, wherein the second information comprises:

an identifier of the at least one item or the order;

at least one location of the at least one item within the distribution facility building; and an instruction to transport the at least one item to a staging area associated with at least one of the parking location or the distribution facility building;

cause the first sensor to capture a first digital image including a first set of pixel values representing at least a portion of the parking location;

analyze the first set of pixel values;

determine that a vehicle is in the parking location;

identify a second set of pixel values of the first digital image corresponding to at least a portion of the vehicle;

recognize the vehicle based at least in part on the second set of pixel values;

determine that the vehicle is associated with the customer identifier based at least in part on a record maintained in a data store;

in response to determining that the vehicle in the parking location is associated with the customer identifier:

determine a position of a second mobile device associated with a second worker;

determine, based at least in part on the position of the second mobile device, that the second worker is within a vicinity of the staging area;

transmit a first message comprising fifth information to the second mobile device, wherein the fifth information comprises:

an identifier of the staging area; and an identifier of at least one of the vehicle, an occupant of the vehicle, or the customer associated with the order; and transmit a second message comprising sixth information to a third mobile device associated with at least one of the vehicle, the occupant, or the customer, wherein the sixth information comprises:

an identifier of the second worker;

an identifier of the at least one item; and an estimated time of arrival of the second worker, the at least one item, or the order at the parking location.

13. The system of claim 12, further comprising a second sensor associated with the staging area of the distribution facility building, wherein the second sensor comprises a first RFID reader, wherein the first RFID reader is in communication with the at least one server, and wherein the at least one server is further configured to at least:

receive, at the first RFID reader, at least a first RFID signal transmitted from a first RFID device associated with the second worker;

determine that the first RFID signal is no longer received at the first RFID reader, wherein the second message is transmitted in response to determining that the first RFID signal is no longer received at the first RFID reader; and store a first indication that at least one of the second worker or the at least one item is not at the staging area in at least one data store.

14. The system of claim 13, wherein the at least one server is further configured to at least:

receive, at the first RFID reader, at least a second RFID signal transmitted from a second RFID device associated with the at least one item, wherein the first message is transmitted in response to receiving at least the second RFID signal; and determine that the second RFID signal is no longer received at the first RFID reader, wherein the second message is transmitted in response to determining that each of the first RFID signal and the second RFID signal is no longer received at the first RFID reader.

15. The system of claim 13, further comprising a second RFID reader associated with the parking location, wherein the second RFID reader is in communication with the at least one server, and wherein the at least one server is further configured to at least:

receive, at the second RFID reader, at least the first RFID signal, wherein the second message is transmitted in response to receiving at least the first RFID signal at the second RFID reader, and wherein the second message further comprises an indication that the first worker is within a vicinity of at least one of the parking location or the vehicle.

16. The system of claim 15, wherein the at least one server is further configured to at least:

receive, at the second RFID reader, at least a second RFID signal transmitted from a second RFID device associated with the at least one item, wherein the second message is transmitted in response to receiving at least the first RFID signal and the second RFID signal at the second RFID reader.

17. The system of claim 15, wherein the at least one server is further configured to at least:

after receiving at least the first RFID signal and the second RFID signal at the second RFID reader, determine that the first RFID signal is no longer received at the second RFID reader; and in response to determining that the first RFID signal is no longer received at the second RFID reader, store a second indication that the at least one item has been delivered to the vehicle in the parking location in the at least one data store.

* * * * *